United States Patent
Tsuboi et al.

(10) Patent No.: US 11,418,941 B2
(45) Date of Patent: Aug. 16, 2022

(54) TERMINAL APPARATUS, BASE STATION APPARATUS, COMMUNICATION METHOD, AND INTEGRATED CIRCUIT

(71) Applicants: Sharp Kabushiki Kaisha, Sakai (JP); FG Innovation Company Limited, Tuen Mun (HK)

(72) Inventors: Hidekazu Tsuboi, Sakai (JP); Shohei Yamada, Sakai (JP); Takako Hori, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 17/044,880

(22) PCT Filed: Apr. 2, 2019

(86) PCT No.: PCT/JP2019/014592
§ 371 (c)(1),
(2) Date: Oct. 2, 2020

(87) PCT Pub. No.: WO2019/194164
PCT Pub. Date: Oct. 10, 2019

(65) Prior Publication Data
US 2021/0105605 A1    Apr. 8, 2021

(30) Foreign Application Priority Data
Apr. 4, 2018    (JP) .............................. JP2018-072267

(51) Int. Cl.
*H04W 36/00* (2009.01)
*H04W 8/08* (2009.01)
*H04W 36/32* (2009.01)

(52) U.S. Cl.
CPC ............. *H04W 8/08* (2013.01); *H04W 36/32* (2013.01)

(58) Field of Classification Search
CPC ...... H04W 8/08; H04W 36/32; H04W 64/006
(Continued)

(56) References Cited

U.S. PATENT DOCUMENTS 9,226,130 B2 * 12/2015 Nylander ................ H04W 8/08
9,867,224 B2 * 1/2018 Xu ..................... H04W 36/0085
(Continued)

FOREIGN PATENT DOCUMENTS

EP    3 622 742 B1    10/2020
JP    2008-182660 A    8/2008
(Continued)

OTHER PUBLICATIONS

N1 1 DOCOMO, "Revision of SI: Study on New Radio Access Technology", 3GPP Tsg Ran Meeting #72, RP-161214, Jun. 13-16, 2016, 8 pages.
(Continued)

*Primary Examiner* — Amancio Gonzalez
(74) *Attorney, Agent, or Firm* — Keating & Bennett, LLP

(57) ABSTRACT

A technique is provided that is related to a terminal apparatus, a base station apparatus, a communication method, and an integrated circuit which enable efficient communication. A terminal apparatus includes a receiver configured to receive, from a base station apparatus, a message requesting mobility history information, and a transmitter configured to notify the base station apparatus of the mobility history information, based on the message. The mobility history information includes a list including identifier information (first identifier information) of a cell of a first radio access technology, and a list including identifier information (second identifier information) of a cell of a second radio
(Continued)

access technology. The mobility history information includes stay time information of a limited number of entries, each corresponding to a visit by the terminal apparatus in a cell and/or outside a network.

8 Claims, 8 Drawing Sheets

(58) Field of Classification Search
USPC .......................................................... 455/436
See application file for complete search history.

(56) References Cited

U.S. PATENT DOCUMENTS

| | | | | |
|---|---|---|---|---|
| 9,986,496 | B2* | 5/2018 | Nylander | H04W 28/0226 |
| 10,212,637 | B2* | 2/2019 | Jung | H04W 36/0022 |
| 10,375,628 | B2* | 8/2019 | Nylander | H04W 48/18 |
| 10,834,655 | B2* | 11/2020 | Kim | H04W 8/02 |
| 10,952,099 | B2* | 3/2021 | Futaki | H04W 76/20 |
| 11,083,038 | B2* | 8/2021 | Kim | H04W 24/10 |
| 2015/0208228 | A1* | 7/2015 | Koskinen | H04W 24/10 |
| | | | | 370/252 |
| 2015/0208303 | A1 | 7/2015 | Jung et al. | |
| 2015/0312813 | A1* | 10/2015 | Xu | H04W 36/00837 |
| | | | | 455/438 |
| 2016/0198384 | A1 | 7/2016 | Jung et al. | |
| 2018/0249361 | A1* | 8/2018 | Otsuki | H04W 52/283 |

FOREIGN PATENT DOCUMENTS

| | | |
|---|---|---|
| JP | 2015-528659 A | 9/2015 |
| WO | 2018/017840 A1 | 1/2018 |

OTHER PUBLICATIONS

Qualcomm Incorporated, "Way forward on capabilities coordination for En-Dc", 3GPP Tsg-Ran WG2 Meeting NR ad-hoc, R2-1700574, Jan. 17-19, 2017, pp. 1-3.

Samsung, "Discussion on Speed-dependent Scaling of Measurement-related Parameters and Mobility History Reporting in Nr", 3GPP Tsg Ran WG2 Nr Ad-hoc 0118, Tdoc R2-1801368, Jan. 22-26, 2018, 3 pages.

Samsung, "Speed Dependent Procedures for Inter-RAT Mobility", 3GPP Tsg-Ran WG2#NR AdHoc#2 Meeting, R2-1707093, Jun. 27-29, 2017, 2 pages.

* cited by examiner

```
VisitedCellInfoList ::= SEQUENCE (SIZE (1..maxCellHistory)) OF VisitedCellInfo VisitedCellInfo ::=  SEQUENCE {
    visitedCellId         CHOICE {
        visitedCellIdEUTRA    CHOICE {
            cellGlobalId          CellGlobalIdEUTRA,
            pci-arfcn-eutra       SEQUENCE {
                physCellId            PhysCellIdEUTRA,
                carrierFreq           ARFCN-ValueEUTRA
            }
        },
        visitedCellIdNR       CHOICE {
            cellGlobalId          CellGlobalIdNR,
            pci-arfcn-nr          SEQUENCE {
                physCellId            PhysCellIdNR,
                ssbFrequency          ARFCN-ValueNR
            }
        }
    } OPTIONAL,
    timeSpent             INTEGER (0..4095),
    ...
}
```

FIG. 7

```
VisitedCellInfoListEUTRA ::=    SEQUENCE (SIZE (1..maxCellHistory)) OF VisitedCellInfoEUTRA
VisitedCellInfoEUTRA ::= SEQUENCE {
    visitedCellId           CHOICE {
        cellGlobalId            CellGlobalIdEUTRA,
        pci-arfcn-eutra         SEQUENCE {
            physCellId              PhysCellIdEUTRA,
            carrierFreq             ARFCN-ValueEUTRA
        }
    } OPTIONAL,
    timeSpent               INTEGER (0..4095),
    ...
}

VisitedCellInfoListNR ::=    SEQUENCE (SIZE (1..maxCellHistory)) OF VisitedCellInfoNR
VisitedCellInfoNR ::= SEQUENCE {
    visitedCellId           CHOICE {
        cellGlobalId            CellGlobalIdNR,
        pci-arfcn-nr            SEQUENCE {
            physCellId              PhysCellIdNR,
            ssbFrequency            ARFCN-ValueNR
        }
    } OPTIONAL,
    timeSpent               INTEGER (0..4095),
    ...
}
```

FIG. 8

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit. This application claims priority based on JP 2018-072267 filed on Apr. 4, 2018, the contents of which are incorporated herein by reference.

BACKGROUND ART

A radio access method and a radio network for cellular mobile communications (hereinafter, referred to as "Long Term Evolution (LTE: registered trademark)," or "Evolved Universal Terrestrial Radio Access (EUTRA)") have been studied in the 3rd Generation Partnership Project (3GPP).

Furthermore, as a radio access method and a radio network technology for a 5th generation cellular system, technical studies and standardization of LTE-Advanced Pro which is an enhanced technology of LTE and New Radio technology (NR) which is a new radio access technology have been conducted by the 3GPP (NPL 1).

EUTRA includes a mechanism in which, in a case that a terminal apparatus is in an RRC idle (RRC_IDLE) state, Mobility State Estimation (MSE) of the terminal apparatus is performed based on the number of cells re-selected within a certain period of time. EUTRA also includes a mechanism in which, during RRC connection, as information related to a mobility state, information of the EUTRA cell selected in the RRC idle state, information of the EUTRA cell connected in the RRC connection state, and information related to the stay time in the cell are notified as mobility history information.

Citation List

Non Patent Literature

NPL 1: RP-161214, NTT DOCOMO, "Revision of SI: Study on New Radio Access Technology", June 2016

NPL 2: 3GPP R2-1700574 http://www.3gpp.org/ftp/ts-g_ran/WG2_RL2/TSGR2_AHs/2017_01_NR/Docs/R2-1700574.zip NPL 3: 3GPP R2-1801368 http://www.3 gpp.org/ftp/TS-G_RAN/WG2_RL2/TSGR2_AHs/2018_01_NR/Docs/R2-1700574. zip

SUMMARY OF INVENTION

Technical Problem

Studies have been conducted about a mechanism (MR-DC) in which cells of Radio Access Technologies (RATs) of both LTE and NR are divided into cell groups on a RAT-by-RAT basis and in which the cell groups are allocated to terminal apparatuses, each of which communicates with one or more base station apparatuses. In particular, a mechanism referred to as E-UTRA-NR Dual Connectivity (EN-DC) is under study, in which a base station apparatus for E-UTRA is used as a master node and a base station apparatus for NR is used as a secondary node for communication (NPL 2).

Furthermore, as is the case with LTE, for NR, the mechanisms for mobility state estimation and mobility history information have been under study (NPL 3).

However, in the known LTE mechanism of mobility history information, the mobility history information is generated by using identifiers for EUTRA cells, there is a problem in that useful mobility history information fails to be generated in an environment in which EUTRA cells are mixed with NR cells.

In view of the circumstances described above, an object of an aspect of the present invention is to provide a terminal apparatus capable of efficiently communicating with a base station apparatus, a base station apparatus communicating with the terminal apparatus, a communication method used for the terminal apparatus, a communication method used for the base station apparatus, an integrated circuit mounted on the terminal apparatus, and an integrated circuit mounted on the base station apparatus.

Solution to Problem (1) In order to accomplish the object described above, an aspect of the present invention is contrived to provide the following measures. Specifically, a first aspect of the present invention provides a terminal apparatus including a receiver configured to receive, from a base station apparatus, a message requesting mobility history information, and a transmitter configured to notify the base station apparatus of the mobility history information, based on the message, wherein the mobility history information includes a list including identifier information (first identifier information) of a cell of a first radio access technology, and a list including identifier information (second identifier information) of a cell of a second radio access technology, and the mobility history information includes stay time information of a limited number of entries, each corresponding to a visit by the terminal apparatus in a cell and/or outside a network.

(2) A second aspect of the present invention provides a base station apparatus including a transmitter configured to transmit, to a terminal apparatus, a message requesting mobility history information, and a receiver configured to receive the mobility history information from the terminal apparatus, wherein the mobility history information includes a list including identifier information (first identifier information) of a cell of a first radio access technology, and a list including identifier information (second identifier information) of a cell of a second radio access technology, and the mobility history information includes stay time information of a limited number of entries, each corresponding to a visit by the terminal apparatus in a cell and/or outside a network.

(3) A third aspect of the present invention is a communication method applied to a terminal apparatus, the communication method including the steps of receiving, from a base station apparatus, a message requesting mobility history information, and notifying the base station apparatus of the mobility history information, based on the message, wherein the mobility history information includes a list including identifier information (first identifier information) of a cell of a first radio access technology, and a list including identifier information (second identifier information) of a cell of a second radio access technology, and the mobility history information includes stay time information of a limited number of entries, each corresponding to a visit by the terminal apparatus in a cell and/or outside a network.

(4) A fourth aspect of the present invention is a communication method applied to a base station apparatus, the communication method including the steps of transmitting, to a terminal apparatus, a message requesting mobility history information, and receiving the mobility history information from the terminal apparatus, wherein the mobility history information includes a list including identifier information (first identifier information) of a cell of a first radio access technology, and a list including identifier information (second identifier information) of a cell of a second radio access technology, and the mobility history information includes stay time information of a limited number of entries, each corresponding to a visit by the terminal apparatus in a cell and/or outside a network.

(5) A fifth aspect of the present invention is an integrated circuit mounted on a terminal apparatus, the integrated circuit being configured to cause the terminal apparatus to perform functions of receiving, from a base station apparatus, a message requesting mobility history information, and notifying the base station apparatus of the mobility history information, based on the message, wherein the mobility history information includes a list including identifier information (first identifier information) of a cell of a first radio access technology, and a list including identifier information (second identifier information) of a cell of a second radio access technology, and the mobility history information includes stay time information of a limited number of entries, each corresponding to a visit by the terminal apparatus in a cell and/or outside a network.

(6) A sixth aspect of the present invention is an integrated circuit mounted on a base station apparatus, the integrated circuit being configured to cause the base station apparatus to perform functions of transmitting, to a terminal apparatus, a message requesting mobility history information, and receiving the mobility history information from the terminal apparatus, wherein the mobility history information includes a list including identifier information (first identifier information) of a cell of a first radio access technology, and a list including identifier information (second identifier information) of a cell of a second radio access technology, and the mobility history information includes stay time information of a limited number of entries, each corresponding to a visit by the terminal apparatus in a cell and/or outside a network.

Advantageous Effects of Invention

According to an aspect of the present invention, the terminal apparatus and the base station apparatus can communicate efficiently.

BRIEF DESCRIPTION OF DRAWINGS

FIG. 7 is a diagram illustrating an example of a message configuration according to an embodiment of the present invention.

FIG. 8 is a diagram illustrating another example of the message configuration according to an embodiment of the present invention.

DESCRIPTION OF EMBODIMENTS

Embodiments of the present invention will be described below.

A radio communication system and a radio network according to the present embodiment will be described.

LTE (and LTE-A Pro) and NR may be defined as different RATs. Additionally, LTE that can be connected with NR through Dual connectivity may be distinguished from the known LTE, for example, as eLTE. The present embodiment may be applied to the NR, the LTE and other RATs. Terms associated with the LTE and the NR are used in the following description. However, the present invention may be applied to other technologies using other terms.

Figure 1:
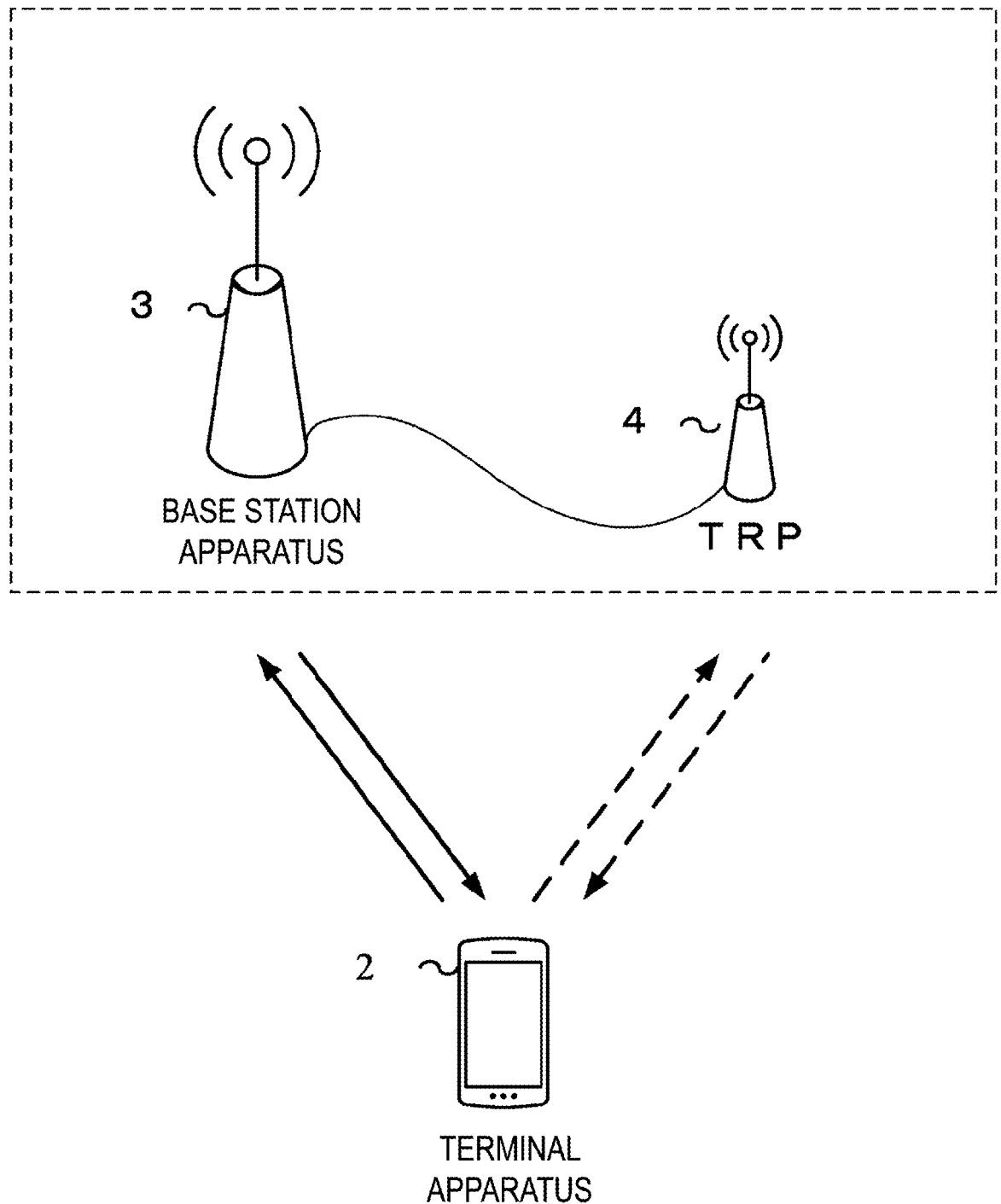
FIG. 1 is a conceptual diagram of a radio communication system according to the present embodiment.

FIG. 1 is a conceptual diagram of a radio communication system according to the present embodiment. In FIG. 1, the radio communication system includes a terminal apparatus 2 and a base station apparatus 3.

The terminal apparatus 2 is also called a user terminal, a mobile station apparatus, a communication terminal, a mobile apparatus, a terminal, User Equipment (UE), and a Mobile Station (MS). The base station apparatus 3 is also referred to as a radio base station apparatus, a base station, a radio base station, a fixed station, a NodeB (NB), an evolved NodeB (eNB), a Base Transceiver Station (BTS), a Base Station (BS), an NR NodeB (NR NB), NNB, a Transmission and Reception Point (TRP), or gNB. The base station apparatus 3 may include a core network apparatus. Furthermore, the base station apparatus 3 may include one or more transmission reception points (TRPs) 4. The base station apparatus 3 may have a communicable range (communication area), controlled by the base station apparatus 3, that includes one or more cells to serve the terminal apparatus 2. The base station apparatus 3 may include a core network apparatus. Furthermore, the base station apparatus 3 may have a communicable range (communication area), controlled by one or more transmission reception points 4, that includes one or more cells to serve the terminal apparatus 2. Additionally, in NR, one cell may be divided into multiple Beamed areas (also referred to as Beamed cells), and the terminal apparatus 2 may be served in each of the beamed areas. Here, the beamed areas may be identified based on the indexes of beams used for beamforming, quasi co-location indexes, indexes indicating temporal positions within a frame described below (or a half frame representing a time length corresponding to half of the frame), or precoding indexes.

The communication area covered by the base station apparatus 3 may be different in size and shape for each frequency. Moreover, the covered area may be different for each frequency. Furthermore, a radio network, in which cells having different types of base station apparatuses 3 and different cell radii coexist on the same frequency or different frequencies to form one communication system, is referred to as a heterogeneous network.

A radio communication link from the base station apparatus 3 to the terminal apparatus 2 is referred to as a downlink. A radio communication link from the terminal apparatus 2 to the base station apparatus 3 is referred to as an uplink. A radio communication link from the terminal apparatus 2 to another terminal apparatus 2 is referred to as a sidelink.

In FIG. 1, Orthogonal Frequency Division Multiplexing (OFDM) including Cyclic Prefix (CP), Single Carrier Frequency Division Multiplexing (SC-FDM), Discrete Fourier Transform Spread OFDM (DFT-S-OFDM), and Multi-Carrier Code Division Multiplexing (MC-CDM) may be employed for radio communication between the terminal apparatus 2 and the base station apparatus 3 and/or the radio communication between the terminal apparatus 2 and another terminal apparatus 2.

In FIG. 1, in the radio communication between the terminal apparatus 2 and the base station apparatus 3 and/or the radio communication between the terminal apparatus 2 and the other terminal apparatus 2, Universal-Filtered Multi-Carrier (UFMC), Filtered OFDM (F-OFDM), OFDM in which a window is multiplied (Windowed OFDM), and Filter-Bank Multi-Carrier (FBMC) may be used.

Note that the present embodiment will be described by using OFDM symbol with the assumption that a transmission scheme is OFDM, and use of any other transmission scheme is also included in an aspect of the present invention. Note that the 01-DM symbols in the present embodiment may be SC-1-DM symbols (may also be referred to Single Carrier Frequency Division Multiple Access (SC-FDMA)) symbols, for example.

In FIG. 1, the aforementioned transmission scheme that uses no CP or uses zero padding instead of the CP may be employed for the radio communication between the terminal apparatus 2 and the base station apparatus 3 and/or the radio communication between the terminal apparatus 2 and the other terminal apparatus 2. Moreover, the CP or zero padding may be added both forward and backward.

The terminal apparatus 2 operates while considering the inside of a cell as a communication area. The terminal apparatus 2 may move to another appropriate cell through a cell re-selection procedure in a case that the terminal apparatus 2 is not wirelessly connected (also referred to as an idle state or an RRC_IDLE state). The terminal apparatus 2 may move to another appropriate cell through a handover procedure in a case that the terminal apparatus 2 is wirelessly connected (also referred to as a connected state, or an RRC_CONNECTED state). Generally, the appropriate cell means that it is determined, based on information indicated from the base station apparatus 3, that access by the terminal apparatus 2 is not prohibited in the cell, and that the reception quality of a downlink satisfies a prescribed condition in the cell. Additionally, the terminal apparatus 2 may move to another appropriate cell through a cell re-selection procedure in a case that the terminal apparatus 2 is in an inactive state. In the inactive state, the terminal apparatus 2 may move to another cell through the handover procedure.

In a case that the terminal apparatus 2 can communicate with a certain base station apparatus 3, a cell configured to be used for communication with the terminal apparatus 2 may be referred to as "Serving cell" and the other cells not used for the communication may be referred to as "Neighboring cell", among the cells of the base station apparatus 3. Additionally, some or all of the system information required in the serving cell may be broadcast or notified to the terminal apparatus 2 by another cell.

According to the present embodiment, one or more serving cells are configured for the terminal apparatus 2. Multiple serving cells to be configured for the terminal apparatus 2 may include one primary cell and one or more secondary cells. For example, the primary cell may be a serving cell in which an initial connection establishment procedure has been performed, a serving cell in which a connection re-establishment procedure has been initiated, or a cell indicated as the primary cell by a handover procedure. One or more secondary cells may be configured at a point of time at which a Radio Resource Control (RRC) connection is established or after the RRC connection is established. Additionally, the terminal apparatus 2 may be configured with a cell group (also referred to as a master cell group (MCG)) including one or more serving cells including a primary cell (PCell), and one or more cell groups (also referred to as secondary cell groups (SCG)) each including one or more serving cells including no primary cell but including a primary secondary cell (PSCell) that can perform at least a random access procedure and that is not brought into the inactive state. The master cell group includes one primary cell and zero or more secondary cells. The secondary cell group includes one primary secondary cell and zero or more secondary cells. Additionally, either the MCG or the SCG may be a cell group including LTE cells. In a case that the MCG and the SCG are cell groups associated with different nodes, a node associated with the MCG may be referred to as a master node (MN), and a node associated with the SCG may be referred to as a secondary node (SN). The master node and the secondary node need not necessarily be physically different nodes (base station apparatuses 3), and the same base station apparatus 3 may be used both as the master node and as the secondary node. The terminal apparatus 2 may not identify whether the master node and the secondary node are the same node (base station apparatus 3) or different nodes (base station apparatuses 3).

Time Division Duplex (TDD) and/or Frequency Division Duplex (FDD) may be applied to the radio communication system according to the present embodiment. The Time Division Duplex (TDD) scheme or the Frequency Division Duplex (FDD) scheme may be applied to all of the multiple cells. Cells to which the TDD scheme is applied and cells to which the FDD scheme is applied may be aggregated.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in the sidelink is referred to as a sidelink component carrier (or a sidelink carrier). The downlink component carrier, the uplink component carrier, and/or the sidelink component carrier are collectively referred to as a component carrier (or a carrier).

Physical channels and physical signals according to the present embodiment will be described. The downlink physical channels and/or the downlink physical signals may be collectively referred to as downlink signals. The uplink physical channels and/or the uplink physical signals may be collectively referred to as uplink signals. The downlink physical channels and/or the uplink physical channels may be collectively referred to as physical channels. The downlink physical signals and/or the uplink physical signals may be collectively referred to as physical signals.

In FIG. 1, in downlink radio communication between the terminal apparatus 2 and the base station apparatus 3, the following downlink physical channels are used. The downlink physical channels are used for transmitting information output from the higher layer.

Physical Broadcast CHannel (PBCH)
Physical Downlink Control Channel (PDCCH)
Physical Downlink Shared Channel (PDSCH)

The PBCH is used for the base station apparatus 3 to broadcast an important information block (Master Information Block: MIB, Essential Information Block: EIB) including important system information (Essential information)

required by the terminal apparatus 2. Here, one or more important information blocks may be transmitted as important information messages. For example, the important information block may include information indicating some or all of System Frame Numbers (SFNs) (e.g., information regarding the positions in a superframe including multiple frames). For example, a radio frame (10 ms) includes 10 subframes each of 1 ms, and radio frames are identified by frame numbers. In a case of reaching 1024, the frame number returns to 0 (Wrap around). In addition, in a case that a different important information block is transmitted for each region within a cell, information for identifying the region (for example, the identifier information of base station transmission beams forming the region) may be included. Here, the identifier information of the base station transmission beams may be indicated by using the indexes of the base station transmission beams (precoding). Furthermore, in a case that a different important information block (important information message) is transmitted for each region within the cell, information for identifying a time location within the frame (for example, a subframe number in which the important information block (important information message) is included) may be included. That is, information may be included that is used to determine each of the numbers of subframes corresponding to respective transmissions of important information blocks (important information messages) using different base station transmission beam indexes. For example, information necessary for connection to the cell and for mobility may be included in the important information. Additionally, the important information message may be a part of the system information message. In addition, some or all of the important information messages may be referred to as minimum system information (Minimum SI). In a case that not all the validated minimum system information in a certain cell can be obtained, the terminal apparatus 2 may consider the cell as a cell in which access is prohibited (Barred Cell). Additionally, only a part of the minimum system information may be broadcast on the PBCH, and the remaining minimum system information may be transmitted on the PDSCH described below.

Additionally, the PBCH may be used to broadcast a time index within the periodicity of a block including the PBCH and the PSS and the SSS described below (also referred to as an SS/PBCH block). Here, the time index is information indicating the indexes of the synchronization signal and the PBCH within the cell. For example, in a case that the SS/PBCH block is transmitted using an assumption for three transmit beams (which may be referred to as a transmission filter configuration, Quasi-Co-Location (QCL) related to reception spatial parameters, or a spatial domain transmission filter), a temporal order within a predetermined periodicity or within a configured periodicity may be indicated. Additionally, the terminal apparatus may recognize a difference in time index as a difference in transmit beam.

In downlink radio communication (radio communication from the base station apparatus 3 to the terminal apparatus 2), the PDCCH is used to transmit Downlink Control Information (DCI). Here, one or more pieces of DCI (which may be referred to as DCI formats) are defined for transmission of the downlink control information. In other words, a field for the downlink control information is defined as DCI and is mapped to information bits.

For example, the DCI may be defined to include information for indicating a timing for transmitting HARQ-ACK with respect to a scheduled PDSCH (for example, the number of symbols from the last symbol included in the PDSCH to the symbol for transmission of the HARQ-ACK).

For example, the DCI may be defined to be used for the scheduling of a downlink radio communication PDSCH in a cell (transmission of a downlink transport block).

For example, the DCI may be defined to be used for the scheduling of an uplink radio communication PUSCH in a cell (transmission of an uplink transport block).

Here, the DCI includes information about the scheduling of the PDSCH or the scheduling of the PUSCH. Here, the DCI for the downlink is also referred to as downlink grant or downlink assignment. Here, the DCI for the uplink is also referred to as uplink grant or uplink assignment.

The PDSCH is used to transmit downlink data (Downlink Shared CHannel (DL-SCH)) from Medium Access Control (MAC). The PDSCH is also used to transmit System Information (SI), a Random Access Response (PAR), and the like.

Here, the base station apparatus 3 and the terminal apparatus 2 exchange (transmit and/or receive) signals with each other in a higher layer. For example, the base station apparatus 3 and the terminal apparatus 2 may transmit and/or receive radio resource control (RRC) signaling (also referred to as RRC message or RRC information) in the RRC layer. The base station apparatus 3 and the terminal apparatus 2 may transmit and/or receive a Medium Access Control (MAC) control element in a MAC layer. Here, the RRC signaling and/or the MAC control element is also referred to as higher layer signaling. Here, the higher layer means a higher layer viewed from the physical layer, and thus may include one or more of a MAC layer, an RRC layer, an RLC layer, a PDCP layer, a NAS layer, and the like. For example, in the MAC layer processing, the higher layer may include one or more of the RRC layer, the RLC layer, the PDCP layer, the NAS layer, or the like.

The PDSCH may also be used to transmit the RRC signaling and the MAC control element. Here, the RRC signaling transmitted from the base station apparatus 3 may be signaling common to multiple terminal apparatuses 2 in a cell. The RRC signaling transmitted from the base station apparatus 3 may be signaling dedicated to a certain terminal apparatus 2 (also referred to as dedicated signaling). In other words, terminal apparatus 2 specific (UE specific) information may be transmitted through signaling dedicated to the certain terminal apparatus 2.

The PRACH may be used to transmit a random access preamble. The PRACH may be used for indicating the initial connection establishment procedure, the handover procedure, the connection re-establishment procedure, synchronization (timing adjustment) for uplink transmission, and a request for a PUSCH (UL-SCH) resource.

In FIG. 1, the following downlink physical signals are used for downlink radio communication. Here, the downlink physical signals are not used to transmit information output from the higher layers but are used by the physical layer.

Synchronization signal (SS)
Reference Signal (RS)

The synchronization signal is used for the terminal apparatus 2 to establish synchronization in a frequency domain and a time domain in the downlink. The synchronization signal may include a Primary Synchronization Signal (PSS) and a secondary synchronization signal (Second Synchronization Signal). Additionally, the synchronization signal may be used for the terminal apparatus 2 to identify a cell identifier (cell ID: Cell Identifier, also referred to as a Physical Cell Identifier (PCI)). The synchronization signal may also be used to select/identify/determine a base station transmission beam to be used by the base station apparatus 3 for downlink beamforming, and/or a terminal reception beam to be used by the terminal apparatus 2. In other words, the synchronization signal may be used to allow the terminal apparatus 2 to select/identify/determine the index of the base station transmission beam applied to the downlink signal by the base station apparatus 3. The synchronization signal, primary synchronization signal, and secondary synchronization signal used in NR may be referred to as SS, PSS, and SSS, respectively. The synchronization signal may also be used to measure the quality of the cell. For example, the received power of the synchronization signal (which may be referred to as SS-RSRP or as RSRP as is the case with the reference signal received power) or the reception quality of the synchronization signal (which may be referred to as SS-RSRQ or as RSRQ as is the case with the reference signal received quality) may be used for the measurement. Additionally, the synchronization signal may be used for channel compensation on some downlink physical channels.

The downlink reference signal (hereinafter, also simply referred to as a reference signal in the present embodiment) may be classified into multiple reference signals based on applications and the like. For example, one or more of the following reference signals may be used for the reference signal.

Demodulation Reference Signal (DMRS)
Channel State Information Reference Signal (CSI-RS)
Phrase Tracking Reference Signal (PTRS)
Mobility Reference Signal (MRS)

The DMRS may be used for channel compensation during demodulation of a received modulation signal. For the DMRS, a DMRS for demodulation of the PDSCH, a DMRS for demodulation of the PDCCH, and/or a DMRS for demodulation of the PBCH may be collectively referred to as the DMRS or may be individually defined.

The CSI-RS may be used for channel state measurement. The PTRS is used to track phase according to movement of the terminal or the like. The MRS may be used to measure quality of reception from multiple base station apparatuses for handover.

Furthermore, the reference signal may be defined as a reference signal for compensating for phase noise.

However, for at least some of the multiple reference signals, the functions thereof may be provided by other reference signals.

In addition, at least one of the multiple reference signals or other reference signal may be defined as a Cell-specific reference signal (CRS) individually configured for the cell, a Beam-specific reference signal (BRS) for each transmit beam used by the base station apparatus 3 or the transmission reception point 4, and/or a UE-specific reference signal (URS) individually configured for the terminal apparatus 2.

Additionally, at least one of the reference signals may be used for Fine synchronization sufficient for numerologies for radio parameters, subcarrier spacings, and the like, or FFT window synchronization.

Additionally, at least one of the reference signals may also be used for Radio Resource Measurement (RRM). In addition, at least one of the reference signals may be used for beam management. Radio resource measurements are also simply referred to as measurements below.

At least one of the reference signals may also include a synchronization signal.

In FIG. 1, in uplink radio communication between the terminal apparatus 2 and the base station apparatus 3 (radio communication from the terminal apparatus 2 to the base station apparatus 3), the following uplink physical channels are used. The uplink physical channels are used for transmitting information output from a higher layer.

Physical Uplink Control CHannel (PUCCH)
Physical Uplink Shared CHannel (PUSCH)
Physical Random Access CHannel (PRACH)

The PUCCH is used to transmit uplink control information (UCI). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK). The HARQ-ACK may indicate a HARQ-ACK for downlink data (Transport block, Medium Access Control Protocol Data Unit (MAC PDU), or Downlink-Shared Channel (DL-SCH)).

The PUSCH is used to transmit uplink data (Uplink Shared CHannel (UL-SCH)) from Medium Access Control (MAC). The PUSCH may also be used to transmit the HARQ-ACK and/or CSI along with the uplink data. Furthermore, the PSCH may be used to transmit the CSI only or the HARQ-ACK and CSI only. In other words, the PSCH may be used to transmit the UCI only.

The PUSCH may be used to transmit the RRC signaling and the MAC control element. The PUSCH may be used to transmit UE Capabilities in the uplink.

Note that the same designation (e.g., PCCH) and the same channel definition may be used for the PDCCH and the PUCCH. The same designation (e.g., PSCH) and the same channel definition may be used for PDSCH and PUSCH.

The BCH, the UL-SCH, and the DL-SCH are transport channels. A channel used in the Medium Access Control (MAC) layer is referred to as a transport channel A unit of the transport channel used in the MAC layer is also referred to as a transport block (TB) or a MAC Protocol Data Unit (PDU). The transport block is a unit of data that the MAC layer delivers to the physical layer. In the physical layer, the transport block is mapped to a codeword, and coding processing is performed for each codeword.

A radio protocol structure according to the present embodiment will be described.

In the present embodiment, a protocol stack handling user data of the terminal apparatus 2 and the base station apparatus 3 is referred to as User-plane (U-Plane (UP)) protocol stack, and a protocol stack handling control data is referred to as Control-plane (C-Plane (CP)) protocol stack.

The physical layer (PHY layer) uses the physical channels to provide a transmission service to a higher layer. The PHY layer is connected with a Medium Access Control layer (MAC layer), which is a higher layer, via the transport channels. The data is exchanged via the transport channels between the MAC layer and the PHY layer. The data is transmitted and/or received via the physical channels between the PHY layers of the terminal apparatus 2 and the base station apparatus 3.

The MAC layer maps various logical channels to the various transport channels. The MAC layer is connected with a Radio Link Control layer (RLC layer), which is a higher layer, via the logical channels. The major classifications of the logical channel depend on the type of information to be transmitted, specifically, the logical channels are classified into control channels for transmitting control information and traffic channels for transmitting user information. The MAC layer has a function to control the PHY layer in order to perform the Discontinuous Reception (DRX) and Discontinuous Transmission (DTX), a function to perform the random access procedure, a function to notify transmit power information, a function to perform the HARQ control, and the like.

The RLC layer segments data received from the higher layer to adjust the size of the data so that a lower layer can appropriately transmit the data. The RLC layer also has a function to ensure Quality of Service (QoS) required for each data. In other words, the RLC layer has a function of data re-transmission control or the like.

A Packet Data Convergence Protocol layer (PDCP layer) may have a header compression function to compress unnecessary control information in order to efficiently transmit an IP packet, which is the user data, in a radio segment. The PDCP layer may also have a data encryption function.

The Service Data Adaptation Protocol layer (SDAP layer) may have a function of mapping between the QoS flow and DRB described below. Additionally, the SDAP layer may have a function of marking the QoS flow identifier (QoS Flow ID (QFI)) of both the downlink packet and the uplink packet. A single protocol entity of the SDAP may be configured for each individual PDU session except for dual connectivity for which two entities may be configured.

A Radio Resource Control layer (RRC layer) is present in the control plane protocol stack. The RRC layer configures and reconfigures Radio Bearers (RBs) to control the logical channels, the transport channels, and the physical channels. The RBs may be classified into a Signaling Radio Bearer (SRB) and a Data Radio Bearer (DRB), and the SRB may be used as a path for transmitting an RRC message which is control information. The DRB may be used as a path for transmitting the user data. The RBs may be configured between the RRC layers of the base station apparatus 3 and the terminal apparatus 2.

The SRB is defined as a radio bearer used to transmit the RRC message and the NAS message. Furthermore, for the SRB, the following may be defined: an SRB for the RRC message using a CCCH logical channel (SRB0), an SRB for the RRC message using a DCCH logical channel and the NAS message transmitted before the establishment of SRB2 (SRB1) and an SRB for the NAS message using the DCCH logical channel and the RRC message including Logged measurement information and the like (SRB2). Additionally, other SRBs may be defined.

In the MR-DC, the terminal apparatus 2 may have one RRC state based on a single C-plane connection between the RRC of the master node and the core network (e.g., a connected state (RRC_CONNECTED), an idle state (RRC_IDLE), an idle state holding parameters used during connection (RRC_INACTIVE), and the like). Additionally, in the MR-DC, each node (the master node and the secondary node) may include an RRC entity of the node itself (also referred to as a radio resource control entity or a radio control entity) that can generate the RRC PDU sent to the terminal apparatus 2.

The MCG SRB is a direct SRB between the master node and the terminal apparatus 2, and is used for the terminal apparatus 2 to transmit and/or receive an RRC Protocol Data Unit (PDU) directly to and from the master node. The MCG Split SRB is an SRB between the master node and the terminal apparatus 2, and is used for the terminal apparatus 2 to transmit and/or receive the RRC Protocol Data Unit (RRC PDU) to and from the master node by using a direct path to the master node and a path via the secondary node. The PDCP is provided on the MCG side, and thus the MCG Split SRB will be described herein as MCG SRB. In other words, the "MCG SRB" may be replaced with the "MCG SRB and/or the MCG Split SRB".

The SCG SRB is a direct SRB between the secondary node and the terminal apparatus 2, and is used for the terminal apparatus 2 to transmit and/or receive the RRC PDU directly to and from the secondary node. The SCG Split SRB is an SRB between the secondary node and the terminal apparatus 2, and is used for the terminal apparatus 2 to transmit and/or receive the RRC Protocol Data Unit (RRC PDU) to and from the secondary node by using a path via the master node and a direct path to the secondary node. The PDCP is provided on the SCG side, and thus the SCG Split SRB will be described herein as the SCG SRB. In other words, the "SCG SRB" may be replaced with "SCG SRB and/or SCG Split SRB". Additionally, in the EN-DC, the MCG SRB, the SCG SRB, and the MCG Split SRB may be exclusively used. In the EN-DC, the SCG Split SRB need not be used.

Additionally, the RRC PDU transmitted to and received from the secondary node may be included in the RRC PDU transmitted to and received from the master node. For example, the RRC PDU transmitted to and received from the secondary node may be transmitted to the master node by being included in the RRC PDU transmitted to and received from the master node (e.g., as data not interpreted by the master node as an RRC message to the master node itself), and the master node may transparently pass the data to the secondary node (without any change in the data). Additionally, the RRC PDU generated by the secondary node may be transferred to the terminal apparatus 2 via the master node. The master node may always send the first RRC configuration of the secondary node to the terminal apparatus 2 by using the MCG SRB.

Additionally, the SRB0, SRB1, and SRB2 may be prepared for the MCG SRB. In addition, for the SCG SRB, an SRB3 corresponding to the SRB1 and/or SRB2 of the MCG SRB may be prepared. It may be allowable that the SRB0 is not supported for the MCG Split SRB.

It may be allowable that the NAS message is precluded from being sent on the SCG SRB. On the SCG SRB, it may be allowable that a certain RRC message (e.g., a part or all of an RRC connection reconfiguration message and a message related to measurement (such as a measurement report message) can be exclusively sent. Additionally, the SCG SRB may be used exclusively for the RRC configuration (and/or RRC reconfiguration) of the secondary node that does not require coordination with the master node.

Note that the PHY layer corresponds to a physical layer, which is a first layer in a layered structure of a generally known Open Systems Interconnection (OSI) model, the MAC layer, the RLC layer, and the PDCP layer correspond to a data link layer, which is a second layer in the OSI model, and the RRC layer corresponds to a network layer, which is a third layer in the OSI model.

The functional classification of the MAC layer, the RLC layer, the PDCP layer, and the SDAP layer described above is an example, and some or all of the functions may be omitted from the implementation. Some or all of the functions of each layer may be included in another layer. For example, from the physical layer viewpoint, the MAC layer control element and the RRC signaling correspond to higher layer signaling. For example, from the MAC layer viewpoint, the RRC signaling corresponds to higher layer signaling. From the RRC layer viewpoint, the MAC layer and the physical layer correspond to lower layers. Furthermore, from the RRC layer viewpoint, the PDCP layer and the RLC layer also correspond to lower layers. From the RRC layer viewpoint, for example, the NAS layer is also referred to as a higher layer.

A signaling protocol used between the network and the terminal apparatus 2 is classified into an Access Stratum (AS) protocol and a Non-Access Stratum (NAS) protocol. For example, a protocol in the RRC layer or in a lower layer is the Access Stratum protocol used between the terminal apparatus 2 and the base station apparatus 3. Additionally, a protocol such as Connection Management (CM) and Mobility Management (MM) of the terminal apparatus 2 is the Non-Access Stratum protocol, and is used between the terminal apparatus 2 and a core network (CN). For example, between the terminal apparatus 2 and a Mobility Management Entity (MME), communication using the Non-Access Stratum protocol is transparently performed via the base station apparatus 3.

The subframe will now be described. The subframe in the embodiment may also be referred to as a resource unit, a radio frame, a time period, or a time period. Additionally, one or more subframes may be included in one radio frame.

Figure 4:
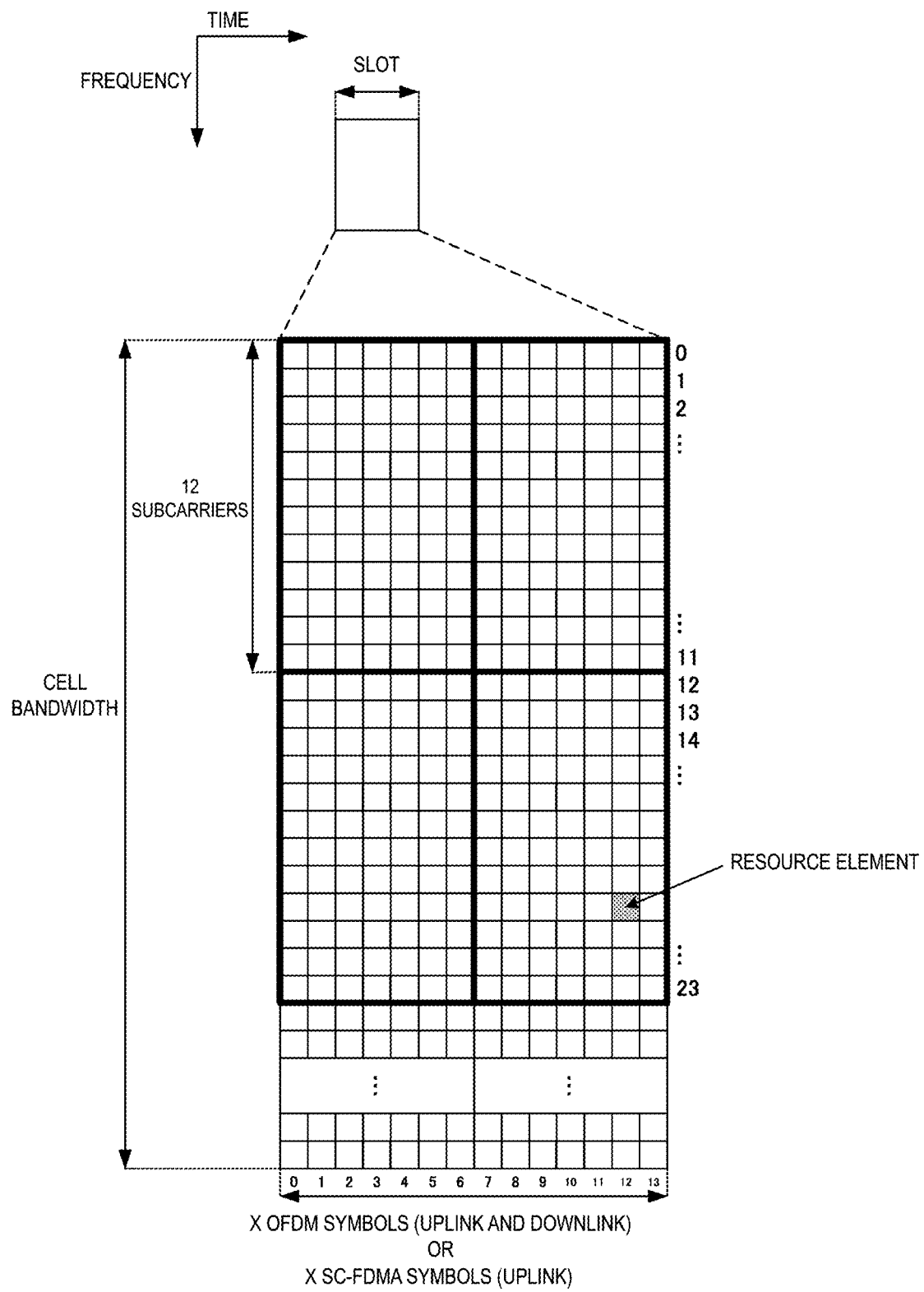
FIG. 4 is a diagram illustrating a schematic configuration of a downlink slot according to an embodiment of the present invention.

FIG. 4 is a diagram illustrating a schematic configuration of an uplink and downlink slot according to a first embodiment of the present invention. Each of the radio frames is 10 ms in length. Additionally, each of the radio frames includes 10 subframes and W slots. In addition, one slot includes X OFDM symbols. In other words, the length of one subframe is 1 ms. For each of the slots, time length is defined based on subcarrier spacings. For example, in a case that the subcarrier spacing of an OFDM symbol is 15 kHz and Normal Cyclic Prefixes (NCPs) are used, X=7 or X=14, and X=7 ad X=14 correspond to 0.5 ms and 1 ms, respectively. In addition, in a case that the subcarrier spacing is 60 kHz, X=7 or X=14, and X=7 and X=14 correspond to 0.125 ms and 0.25 ms, respectively. Additionally, for example, in a case of X=14, W=10 in a case that the subcarrier spacing is 15 kHz, and W=40 in a case that the subcarrier spacing is 60 kHz. FIG. 4 illustrates a case of X=7 as an example. Note that a case of X=14 can be similarly configured by expanding the case of X=7. Furthermore, the uplink slot is defined similarly, and the downlink slot and the uplink slot may be defined separately. Additionally, the bandwidth of the cell in FIG. 4 may also be defined as a part of the band (which may be a BWP). The slot may also be defined as a Transmission Time Interval (TTI). The slot need not be defined as TTI. TTI may be a transmission period for transport blocks.

The signal or the physical channel transmitted in each of the slots may be represented by a resource grid. The resource grid is defined by multiple subcarriers and multiple OFDM symbols. The number of subcarriers constituting one slot depends on each of the downlink and uplink bandwidths of a cell. Each element in the resource grid is referred to as a resource element. The resource element may be identified by using a subcarrier number and an OFDM symbol number.

The resource grid is used to represent mapping of a certain physical downlink channel (such as the PDSCH) or a certain physical uplink channel (such as the PUSCH) to resource elements. For example, for a subcarrier spacing of 15 kHz, the number X of OFDM symbols included in the subframe is 14, and in a case of NCPs, one physical resource block is defined by 14 continuous OFDM symbols in the time domain and by 12*Nmax continuous subcarriers in the frequency domain. Nmax is the maximum number of resource blocks determined by the subcarrier spacing configuration μ described below. In other words, the resource grid includes (14*12*Nmax, μ) resource elements. In a case of Extended CPs (ECPs), the resource grid is supported only at a subcarrier spacing of 60 kHz, and thus one physical resource block is defined by 12 (the number of OFDM symbols included in one slot)*4 (the number of slots included in one subframe)=48 continuous OFDM symbols in the time domain and by 12*Nmax, μ continuous subcarriers in the frequency domain, for example. In other words, the resource grid includes (48*12*Nmax, μ) resource elements.

As resource blocks, common resource blocks, physical resource blocks, and virtual resource blocks are defined. One resource block is defined as 12 continuous subcarriers in the frequency domain. A subcarrier index 0 at a common resource block index 0 may be referred to as a reference point (which may be referred to as point a"). The common resource blocks are resource blocks numbered in an ascending order at a subcarrier spacing configuration μ starting from 0 at a reference point A. The resource grid described above is defined by the common resource blocks. The physical resource blocks are resource blocks included in a bandwidth portion (BWP) described below and numbered in ascending order from 0, and the physical resource blocks are resource blocks included in the bandwidth portion (BWP) and numbered in ascending order from 0. A certain physical uplink channel is first mapped to a virtual resource block. Thereafter, the virtual resource block is mapped to a physical resource block.

Now, the subcarrier spacing configuration μ will be described. As described above, in NR, multiple OFDM numerologies are supported. In a certain BWP, the subcarrier spacing configuration μ (μ=0, 1, . . . 5) and a cyclic prefix length are given for the downlink BWP by the higher layer, and is given for the uplink BWP by the higher layer. In a case that μ is given, the subcarrier spacing Δf is given by Δf=2^μ·15 (kHz).

In the subcarrier spacing configuration μ, the slots are counted, in the subframe, in an ascending order from 0 to N^{subframe, μ}_{slot}−1, and counted, in the frame, in ascending order from 0 to N^{frame, μ}_{slot}−1. N^{slot}_{symb} continuous OFDM symbols are in the slot based on the slot configuration and cyclic prefix. N^{slot}_{symb} is 14. The start of the slots n^{μ}_{s} in the subframe is temporally aligned with the start of n^{μ}_{s} N^{slot}_{symb}-th OFDM symbol in the same subframe.

Figure 5:
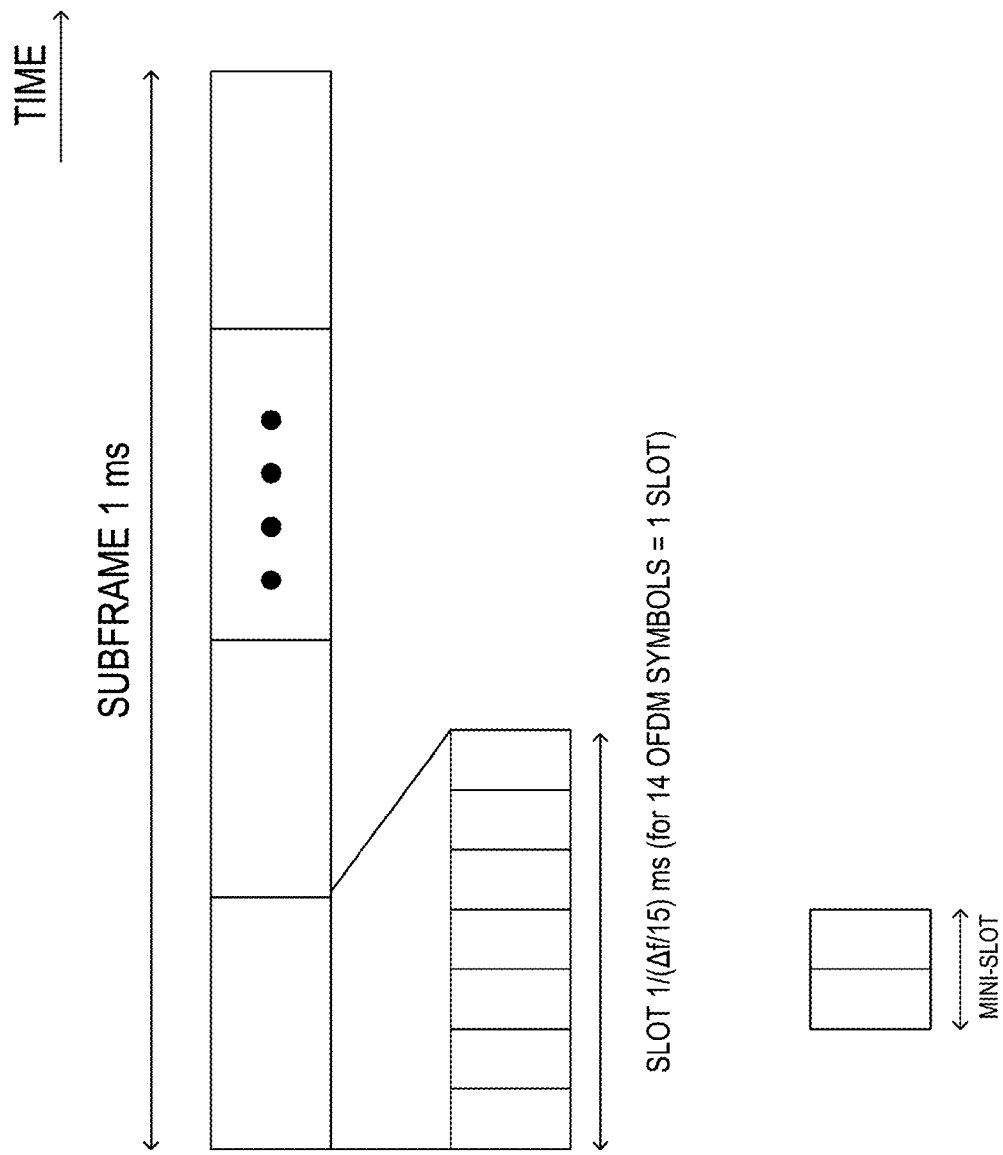
FIG. 5 is a diagram illustrating the relationship between subframes and slots and mini-slots in a time domain according to an embodiment of the present invention.

The subframe, the slot, and a mini-slot will now be described. FIG. 5 is a diagram illustrating the relationship between subframes and slots and mini-slots in the time domain. As illustrated in FIG. 5, three types of time units are defined. The subframe is 1 ms regardless of the subcarrier spacing. The number of OFDM symbols included in the slot is 7 or 14, and the slot length depends on the subcarrier spacing. Here, in a case that the subcarrier spacing is 15 kHz, 14 OFDM symbols are included in one subframe. The downlink slot may be referred to as a PDSCH mapping type A. The uplink slot may be referred to as a PUSCH mapping type A.

The mini-slot (which may be referred to as a sub-slot) is a time unit including OFDM symbols that are less in number than the OFDM symbols included in the slot. FIG. 5 illustrates, by way of example, a case in which the mini-slot includes 2 OFDM symbols. The OFDM symbols in the mini-slot may match the timing for the OFDM symbols constituting the slot. Note that the smallest unit of scheduling may be a slot or a mini-slot. Additionally, allocating mini-slots may be referred to as non-slot based scheduling. Additionally, scheduling of mini-slots may be expressed as scheduling of resources with a fixed relative temporal position between the reference signal and the start position of the data. The downlink mini-slot may be referred to as a PDSCH mapping type B. The uplink mini-slot may be referred to as a PUSCH mapping type B.

Figure 6:
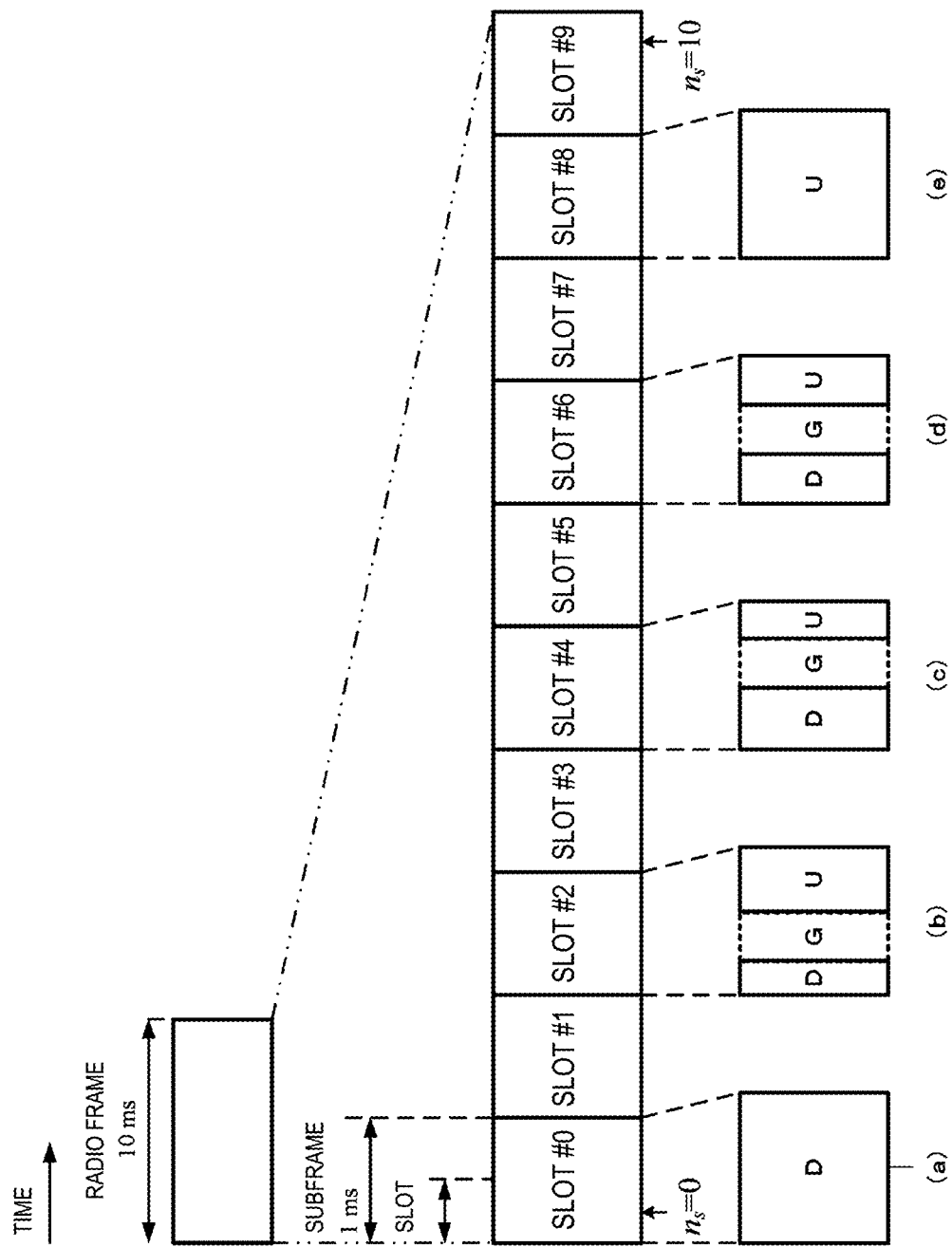
FIG. 6 is a diagram illustrating an example of slots or subframes according to an embodiment of the present invention.

FIG. 6 is a diagram illustrating an example of a slot format. Here, a case in which the slot length is 1 ms at a subcarrier spacing of 15 kHz is illustrated as an example. In FIG. 6, D represents the downlink, and U represents the uplink. As illustrated in FIG. 6, a certain time period (for example, the minimum time period to be allocated to one UE in the system), the subframe may include one or more of:
  downlink symbol,
  flexible symbol, and
  uplink symbol. Note that the ratio of the symbols may be predetermined as a slot format. Additionally, the ratio may be defined by the number of downlink OFDM symbols included in the slot or the start position and the end position within the slot. Alternatively, the ratio may be defined by the number of uplink OFDM symbols or DFT-S-OFDM symbol number included in the slot or the start position and the end position within the slot. Note that scheduling of slots may be expressed as scheduling of resources with a fixed relative temporal position between the reference signal and the slot boundary.

FIG. 6(a) is an example in which all of a certain time period (e.g., a minimum unit of time resource that can be allocated to a UE, a time unit, or the like. Additionally, multiple minimum units of time resources may be referred to as a time unit) is used for downlink transmission, and in FIG. 6(b), the first time resource is used to perform uplink scheduling, for example, via the PCCH, and an uplink signal is transmitted after a gap for a processing delay in the PCCH and the time for switching from the downlink to the uplink in the PCCH, and generation of a transmit signal. In FIG. 6(c), a downlink PCCH and/or downlink PSCH are transmitted by using the first time resource, and the PSCH or PCCH is transmitted after a gap for a processing delay, the time for switching from the downlink to the uplink, and generation of a transmit signal. Here, for example, the uplink signal may be used to transmit the HARQ-ACK and/or CSI, namely, the UCI. In FIG. 6(d), a downlink PCCH and/or a downlink PSCH are transmitted by using the first time resource, and a PSCH or PCCH is transmitted after a gap for a processing delay, the time for switching from the downlink to the uplink, and generation of a transmit signal. Here, for example, the uplink signal may be used to transmit the uplink data, namely, the UL-SCH. FIG. 6(e) is an example in which all of the time interval is used for uplink transmission (uplink PSCH or PCCH).

The above-described downlink part and uplink part may include multiple OFDM symbols as is the case with LTE.

The measurement will be described.

The base station apparatus 3 transmits, to the terminal apparatus 2, a Measurement configuration message by using an RRC signaling (radio resource control signal). The RRC signaling may be an RRC connection reconfiguration (RRC-ConnectionReconfiguration) message in LTE and an RRC reconfiguration (RRCReconfiguration) message in NR. The terminal apparatus 2 configures system information included in the Measurement configuration message, and further performs, in accordance with the notified system information, measurement, event evaluation, and measurement reporting on the serving cell and neighbor cells (including listed cells and/or detected cells) are performed. The listed cells are cells listed in Measurement object(s) (cells notified from the base station apparatus 3 to the terminal apparatus 2 as a neighbor cell list), and the detected cells are cells detected by the terminal apparatus 2 at frequencies indicated by the Measurement objects but not listed in the Measurement objects but not listed in the Measurement objects (cells detected by the terminal apparatus 2 itself and not notified as the neighbor cell list).

The measurement includes three types: intra-frequency measurements, inter-frequency measurements, and inter-radio access technology measurements (inter-RAT measurements). The intra-frequency measurements are measurements at the downlink frequency of the serving cell (downlink frequency). The inter-frequency measurements are measurements at a frequency different from the downlink frequency of the serving cell. Inter-radio access technology measurements (inter-RAT measurements) are measurements based on a radio technology different from the radio technology of the serving cell. For example, in MR-DC, a measurement configuration made by the MN may define, as the inter-radio access technology measurements, measurements based on a radio technology different from the radio technology of the serving cell of the MN, and a measurement configuration made by the SN may define, as the inter-radio access technology measurements, measurements based on a radio technology different from the radio technology of the serving cell of the SN.

The Measurement configuration message includes addition and/or modification of configurations for a measurement identifier (measId), Measurement objects, and Reporting configurations, a quantity configuration (quantityConfig), a measurement gap configuration (measGapConfig), serving cell quality threshold (s-Measure), and the like.

Quantity Configuration (quantityConfig)

The quantity configuration (quantityConfig) designates a Layer 3 (L3) filtering coefficient in a case that, for example, the Measurement object is EUTRA. The Layer 3 (L3) filtering coefficient specifies a ratio between the latest measurement result and the past measurement result. The filtering result is used for event evaluation in the terminal apparatus 2.

Measurement Gap Configuration (measGapConfig)

Measurement gap configuration (measGapConfig) may be utilized to control configuration of a measurement gap pattern and activation/deactivation of the measurement gap. For the measurement gap configuration (measGapConfig), the gap pattern, a start system frame number (startSFN), and a start sub-frame number (startSubframeNumber) are notified as information for activating the measurement gap. The gap pattern defines which pattern is used as the measurement gap. The start system frame number (startSFN) defines a System Frame Number (SFN) at which the measurement gap is started. The start sub-frame number (startSubframeNumber) defines a sub-frame number at which the measurement gap is started.

Serving Cell Quality Threshold (s-Measure)

The serving cell quality threshold (s-Measure) represents a threshold for the quality of the serving cell, and is used to control whether the terminal apparatus 2 needs to perform measurement. The serving cell quality threshold (s-Measure) is configured as a value for reference signal received power (RSRP).

Measurement Identifier (measId)

Here, the measurement identifier (measId) is utilized to link the Measurement objects and the Reporting configurations. Specifically, the measurement identifier (measId) links a measurement object identifier (measObjectId) and a reporting configuration identifier (reportConfigId). The measurement identifier (measId) is associated with one measurement object identifier (measObjectId) and one reporting configuration identifier (reportConfigId). For the Measurement configuration message, additions, modifications, and deletions can be made to the relationship between the measurement identifier (measId), Measurement objects, and Reporting configurations.

measObjectToRemoveList is a command to delete Measurement objects corresponding to the designated measurement object identifier (measObjectId) and the designated measurement object identifier (measObjectId). At this time, all measurement identifiers (measId) associated with the designated measurement object identifier (measObjectId) are deleted. The command can simultaneously designate multiple measurement object identifiers (measObjectId).

measObjectToAddModifyList is a command to modify the designated measurement object identifier (measObjectId) to the designated Measurement objects or to add the designated measurement object identifier (measObjectId) and the designated Measurement objects. The command can simultaneously designate multiple measurement object identifiers (measObjectId).

reportConfigToRemoveList is a command to delete the designated reporting configuration identifier (reportConfigId) and the reporting configurations corresponding to the designated Reporting configuration identifier (reportConfigId). At this time, all measurement identifiers (measId) associated with the designated reporting configuration identifier (reportConfigId) are deleted. This command can simultaneously specify multiple reporting configuration identifiers (reportConfigId).

reportConfigToAddModifyList is a command to modify the designated reporting configuration identifier (reportConfigId) to the designated reporting configurations (Reporting configurations) or to add the designated reporting configuration identifier (reportConfigId) to the designated reporting configurations (Reporting configurations). This command can simultaneously specify multiple reporting configuration identifiers (reportConfigId).

measIdToRemoveList is a command to delete the designated measurement identifier (measId). At this time, the measurement object identifier (measObjectId) and the reporting configuration identifier (reportConfigId) associated with the designated measurement identifier (measId) are maintained without being deleted. The command can simultaneously specify multiple measurement identifiers (measId).

measIdToAddModifyList is a command to modify the designated measurement identifier (measId) to associate the designated measurement identifier (measId) with the designated measurement object identifier (measObjectId) and the designated reporting configuration identifier (reportConfigId) or to associated the designated measurement object identifier (measObjectId) and the designated reporting configuration identifier (reportConfigId) with the designated measurement identifier (measId) and to add the designated measurement identifier (measId). The command can simultaneously specify multiple measurement identifiers (measId).

Measurement Object

The Measurement objects are defined for each RAT and each frequency. Additionally, the Reporting configurations are defined for the RAT identical to the RAT of the serving cell and for the other RATs.

The Measurement objects may include a measurement object EUTRA (measObjectEUTRA), a measurement object NR (measObjectNR), a measurement object UTRA (measObjectUTRA), a measurement object GERAN (measObjectGERAN), a measurement object CDMA2000 (measObjectCDMA2000), a measurement object WLAN (measObjectWLAN), and the like associated with the measurement object identifier (measObjectId).

The measurement object identifier (measObjectId) is an identifier used to identify the configurations of the Measurement objects. The configurations of the Measurement objects are defined for each radio access technology (RAT) or for each frequency as described above. The Measurement objects are specified separately for EUTRA, NR, UTRA, GERAN, and CDMA2000. The measurement object EUTRA (measObjectEUTRA), corresponding to a Measurement object for EUTRA, defines information to be applied to neighbor cells of EUTRA. In addition, a measurement object included in the Measurement object EUTRA and having a different frequency is treated as a different measurement object, and allocated with a separate measurement object identifier (measObjectId). The measurement object NR (measObjectNR), corresponding to a Measurement object for the NR, defines information to be applied to neighbor cells of NR. In addition, a measurement object included in the measurement object NR and having a different frequency is treated as a different Measurement object, and allocated with a separate measurement object identifier (measObjectId).

The measurement object EUTRA (measObjectEUTRA) may include EUTRA carrier frequency information (eutraCarrierInfo), information related to a measurement bandwidth (measurementBandwidth), an offset frequency (offsetFreq), and a neighbour cell list, and information related to a black list.

The measurement object NR (measObjectNR) may frequency information of the SS/PBCH block and/or CSI-RS, a threshold used to derive the quality of the measurement object, offset information of the frequency, the blacklist, and the like.

The information related to the black list includes information regarding event evaluation and neighbor cells that are not subjected to the measurement reporting. The information related to the black list includes a physical cell identifier (physical cell ID) and the like. In a case of EUTRA and/or NR, the information may be utilized as information used for the terminal apparatus 2 to make addition, modification, or deletion to the black cell list (black listed cell list) already obtained from broadcast information.

Note that each measurement object may include different elements or the same elements depending on the RAT of the serving cell.

Reporting Configurations

The Reporting configurations include reporting configuration EUTRA (reportConfigEUTRA), reporting configuration NR (reportConfigNR), and the like associated with the reporting configuration identifier (reportConfigId).

The reporting configuration identifier (reportConfigId) is an identifier used to identify Reporting configurations related to measurement. The Reporting configuration EUTRA (reportConfigEUTRA), corresponding to reporting configurations for EUTRA, defines triggering criteria for an event or periodic reporting utilized for measurement reporting in EUTRA. The reporting configuration NR (reportConfigNR), corresponding to Reporting configurations for NR, defines triggering criteria for an event or periodic reporting utilized for measurement reporting in NR.

The event identifier (eventId) is information utilized to select criteria related to event triggered reporting. Here, the event triggered reporting indicates a method for reporting measurement in a case that the event triggering criteria are satisfied. Besides, event triggered periodic reporting is performed in which measurement is reported a certain number of times at certain time intervals in a case that the event triggering criteria are satisfied.

In a case that the triggering criteria for the event designated by the event identifier (eventId) are satisfied, the terminal apparatus 2 performs measurement report to the base station apparatus 3. The quantity of trigger (triggerQuantity) is the quantity utilized to evaluate the triggering criteria for the event. Specifically, the Reference Signal Received Power (RSRP) or Reference Signal Received Quality (RSRQ) is specified. Specifically, the terminal apparatus 2 uses the quantity specified by the trigger quantity (triggerQuantity) to measure the downlink reference signal, and determines whether the triggering criteria for the event designated by the event identifier (eventId) are satisfied. Hysteresis is a parameter that is utilized in the triggering criteria for the event. Trigger Time (timeToTrigger) indicates a period in which the triggering criteria for the event are to be satisfied. Report quantity (reportQuantity) indicates the quantity reported in the measurement report. Here, for the report quantity, the quantity specified by the trigger quantity (triggerQuantity) or the reference signal received power (RSRP) and reference signal reception quality (RSRQ) are specified. Here, the reference signal reception quality (RSRQ) is the ratio expressed by (N * RSRP)/(Carrier RSSI). The received signal strength (Carrier RSSI) indicates the strength of the total received signal power, and the measurement bandwidth is the same as the system bandwidth. N is the number of Resource Blocks (RB) related to the measurement bandwidth of the received signal strength (Carrier RSSI). The maximum number of reporting cells (maxReportCells) indicates the maximum number of cells included in the measurement report. The report interval (reportInterval) is used for periodical reporting or event triggered periodic reporting, and periodical reporting is performed at the intervals indicated by the report interval (reportInterval). The number of reports (reportAmount) defines the number of times to perform periodical reporting, if necessary.

Note that the base station apparatus 3 may or may not notify the serving cell quality threshold (s-Measure). In a case that the base station apparatus 3 notifies the serving cell quality threshold (s-Measure), the terminal apparatus 2 performs measurement of neighbor cells and event evaluation (determination of whether the event triggering criteria are satisfied, also referred to as evaluation of Reporting criteria) in a case that the quality of the serving cell (RSRP value) is lower than the serving cell quality threshold (s-Measure). On the other hand, in a case that the base station apparatus 3 does not notify the serving cell quality threshold (s-Measure), the terminal apparatus 2 performs the measurement of the neighbor cells and the event evaluation regardless of the quality of the serving cell (RSRP value). For Measurement Result The terminal apparatus 2 that satisfies the event triggering criteria transmits a Measurement report to the base station apparatus 3. The Measurement report includes a Measurement result.

The Measurement result includes the measurement identifier (measId), a serving cell measurement result (measResultServing), and a measurement result list (measResultList). Here, the measurement result list (measResultList) includes a physical cell identifier (physicalCellIdentity) and a cell measurement result (measResult).

Here, the measurement identifier (measId) is an identifier utilized to link the measurement object identifier (measObjectId) and the reporting configuration identifier (reportConfigId) as described above. Additionally, the serving cell measurement result (measResultServing) is a measurement result for the serving cell, and reports the results for the reference signal received power (RSRP) and reference signal received quality (RSRQ) of the serving cell. The physical cell identifier (physicalCellIdentity) is utilized to identify the cell. An EUTRA cell measurement result (measResultEUTRA) included in measResult is a measurement result for the EUTRA cell. Additionally, an NR cell measurement result (measResultNR) included in measResult is a measurement result for the NR cell. The measurement results for neighbor cells may be included only in a case that a related event takes place.

A procedure in EUTRA will be described below.

Mobility History Information will be described.

First, a procedure in which the terminal apparatus 2 stores mobility history information will be described. The procedure covers the RRC_CONNECTED and the RRC_IDLE, and defines how the mobility history information is stored by the terminal apparatus 2.

In a case that the terminal apparatus 2 supports the accumulation of mobility history information, the terminal apparatus 2 performs the following procedure.

Procedure 1: In a case of changing from a PCell, which is one of the serving cells in the RRC_CONNECTED, or the serving cell in the RRC_IDLE to another EUTRA cell or a cell of another RAT or an out-of-service area (Out of service), the terminal apparatus 2 includes a list (VisitedCellInfoList) of entries (VisitedCellInfo) described below in a variable VarMobilityHistoryReport. At this time, the terminal apparatus 2 may delete the oldest entry based on the maximum number of entries that can be accumulated in the variable VarMobilityHistoryReport, before including the entries in the variable. In a case that the cell global identifier of the preceding PCell or serving cell is present (Available), the terminal apparatus 2 includes the cell global identifier of the cell in visitedCellId, which is one of the entry fields. In a case that the cell global identifier of the preceding PCell or serving cell is not present (not Available), the terminal apparatus 2 includes information of the physical cell identifier and information of the carrier frequency of the cell in visitedCellId, which is one of the entry fields. In either case, the terminal apparatus 2 includes information of the time spent in the PCell or the serving cell, in timeSpent, which is one of the entry fields. Note that in a case that the time information exceeds the maximum time that can be indicated by timeSpent, the maximum time that can be indicated by timeSpent is configured. The entries are included in the variable VarMobilityHistoryReport. Here, the cell global identifier is an identifier that can uniquely identify the cell globally in the network, and in EUTRA, is represented by a combination of a PLMN identifier and a physical cell identifier. In NR, the cell global identifier is also an identifier that can uniquely identify the cell globally in the network, and may be represented as a combination of a PLMN identifier and a physical cell identifier, as is the case with EUTRA. Here, the PLMN identifier is an identifier identifying a Public Land Mobile Network (PLMN), and may be broadcast to the terminal apparatus 2 via broadcast information (system information).

Here, VisitedCellInfoList may include, for example, the information of the time spent in up to 16 times most recently visited cells or the time spent outside EUTRA. The information of the time spent in the most recently visited cell or outside EUTRA (i.e. newly added information) may be accumulated at the beginning of the list. In a case that 16 pieces of information have already been accumulated in the list, the above-described information may be added after the 16th piece of information (oldest information) is deleted. The list may include cells visited in the RRC_IDLE state and in the RRC_CONNECTED state. Additionally, VisitedCellInfoListEUTRA and VisitedCellInfoListNR described below may also have the same mechanism.

Procedure 2: In a case of moving from the cell of another RAT or the out-of-service area into (a cell of) EUTRA (in the RRC_CONNECTED or RRC_IDLE), the terminal apparatus 2 includes the entries described below in the variable VarMobilityHistoryReport. At this time, the terminal apparatus 2 may include the entries after deleting the oldest entry based on the size of the variable VarMobilityHistoryReport or the like. The terminal apparatus 2 includes the information of the time spent outside the EUTRA (i.e., a cell of another RAT or an out-of-service area) in timeSpent, which is one of the entry fields. At this time, visitedCellId need not be included in the entries. The entries are included in the variable VarMobilityHistoryReport.

Now, a terminal apparatus information (UE Information) procedure will be described. The terminal apparatus information procedure is used for E-UTRAN (network) to request an information report from the terminal apparatus 2. For example, the mobility history information may be notified from the terminal apparatus 2 to the base station apparatus 3 in accordance with the procedure.

E-UTRAN initiates the procedure by sending an UEInformationRequest message to the terminal apparatus 2.

Procedure 1: The terminal apparatus 2 receives the UEInformationRequest message after activation of security succeeds, and then includes mobilityHistoryReport in the UEInformationResponse message and includes the entry of VarMobilityHistoryReport in mobilityHistoryReport in a case that mobilityHistoryReportReq, which is one element of the UEInformationRequest message, is set true. Furthermore, the terminal apparatus 2 includes the cell global identifier of the current cell (PCell) in visitedCellId, which is one of the entry fields. At this time, the terminal apparatus 2 may include the entries after deleting the oldest entry based on the size of mobilityHistoryReport. The terminal apparatus 2 includes the information of the time spent in the current cell, in timeSpent, which is one of the entry fields. The entries are included in mobilityHistoryReport. Then, the UEInformationResponse message including mobilityHistoryReport is submitted to the lower layer for transmission through the SRB1 or SRB2.

Now, a mechanism will be described in which the base station apparatus 3 is notified of information indicating that the mobility history information is present in the terminal apparatus 2 (Available).

Here, a procedure is illustrated in which the terminal apparatus 2 notifies the base station apparatus 3 of the presence of the mobility history information during the RRC connection.

For example, in a connection re-establishment procedure, the terminal apparatus 2 receives an RRC connection setup message from the base station apparatus 3, and then performs a configuration procedure for radio resources in accordance with a radio resource individual configuration (radioResourceConfigDedicated) included in the received RRC connection setup message. Furthermore, the terminal apparatus 2, for example, stops various timers and enters RRC_CONNECTED to stop the cell re-selection procedure. Then, the terminal apparatus 2 determines the current cell to be PCell. Furthermore, in a case that any information has been received from the higher layer (NAS layer) as the content of a message (RRCConnectionSetupComplete message) indicating to the base station apparatus 3 that the RRC connection setup is complete, the terminal apparatus 2 includes the information as dedicatedInfoNAS, and in a case that the terminal apparatus 2 supports accumulation of the mobility history information and the mobility history information is present in the variable VarMobilityHistoryReport (Available), then the terminal apparatus 2 includes, in the entries, information (mobilityHistoryAvail) indicating the presence of the mobility history information (Available). The RRCConnectionSetupComplete Message may include other information. The terminal apparatus 2 Submits the RRCConnectionSetupComplete message to the lower layer for transmission, and terminates the procedure.

The example of the RRC connection setup processing has been described, but the present invention is not limited to this example, and in the processing at the time of RRC connection resumption (Resume) as well, the terminal apparatus 2 supports accumulation of the mobility history information as the content of a message (RRCConnectionResumeComplete message) indicating to the base station apparatus 3 that the RRC connection resumption is complete. In a case that the mobility history information is present in the variable VarMobilityHistoryReport (Available), the terminal apparatus 2 may include, in the entries, the information (mobilityHistoryAvail) indicating the presence of the mobility history information (Available).

Based on the above-described mechanism, for example, the base station apparatus 3 is notified of mobilityHistoryAvail through the RRCConnectionSetupComplete message, and then includes MobilityHistoryReportReq in UEInformationRequest as true to notify the terminal apparatus 2 of MobilityHistoryReportReq, and the terminal apparatus 2 can include mobilityHistoryReport in UEInformationResponse to notify the base station apparatus 3 of mobilityHistoryReport.

Now, an example of a procedure related to the mobility history information with NR taken into account will be described.

An example of the Mobility History Information with NR taken into account will be described.

First, a procedure in which the terminal apparatus 2 stores the mobility history information will be described. The procedure covers the RRC_CONNECTED and RRC_IDLE of LTE and the RRC_CONNECTED, RRC_INACTIVE, and RRC_IDLE of NR, and defines how the mobility history information is stored by the terminal apparatus 2.

Example 1: In addition, in a case of supporting the accumulation of the mobility history information, the terminal apparatus 2 performs the following procedure. Here, an example using the entry list illustrated in FIG. 7 is illustrated.

Procedure 1: In a case of changing from the PCell, which is one of the serving cells in the RRC_CONNECTED of EUTRA or NR, or the serving cell in the RRC_IDLE of EUTRA or NR or RRC_INACTIVE of NR to another cell or an out-of-service area (Out of service), the terminal apparatus 2 includes the list (VisitedCellInfoList) of the entries (VisitedCellInfo) described below in the variable VarMobilityHistoryReport. At this time, the terminal apparatus 2 may delete the oldest entry based on the maximum number of entries that can be accumulated in the variable VarMobilityHistoryReport, before including the entries in the variable. In a case that the cell global identifier of the preceding PCell or serving cell is present (Available), the terminal apparatus 2 may include the cell global identifier (cellGlobalId) of the cell in visitedCellId, which is one of the entry fields. In addition, in a case that the preceding PCell or serving cell is a cell of NR, information of the cell of NR may be included. For example, the information of the cell of NR may be the cell global identifier of the cell and/or the index information of the SS/PBCH block. The index information of the SS/PBCH block may be the index information of the SS/PBCH block satisfying a predetermined condition. In a case that the cell global identifier of the preceding PCell or serving cell is not present (not Available) and the preceding PCell or serving cell is a cell of EUTRA, the terminal apparatus 2 includes the physical cell identifier (physCellId) of the cell and information of the carrier frequency (carrierFreq) of the cell in visitedCellId, which is one of the entry fields. In a case that the preceding PCell or serving cell is a cell of NR, information of the cell of NR may be included in visitedCellId, which is one of the entry fields. The information of the cell of NR may be, for example, the physical cell identifier (physCellId) of the cell and the information of the frequency of the SS/PBCH block (ssbFrequency). The information of the cell of NR may be, for example, the physical cell identifier of the cell, the information of the frequency of the SS/PBCH block, and the index information of the SS/PBCH block. In either case, the terminal apparatus 2 may include the information of the time spent in the PCell or the serving cell, in timeSpent, which is one of the entry fields. The entries are included in the variable VarMobilityHistoryReport.

Here, VisitedCellInfoList may include, for example, the up to 16 pieces of information of the time spent in most recently visited EUTRA and NR cells or the time spent outside EUTRA and NR. The information of the most recently visited cell or time spent outside of EUTRA and NR (i.e. newly added information) may be accumulated at the beginning of the list. In a case that 16 pieces of information have already been accumulated in the list, the above-described information may be added after the 16th piece of information (oldest information) is deleted. The list may include cells visited in the RRC_IDLE state, in the RRC_INACTIVE state, and in the RRC_CONNECTED state.

Procedure 2: In a case of moving from the cell of RAT other than EUTRA and NR or the out-of-service area into (a cell of) EUTRA or NR (in the RRC_CONNECTED or RRC_INACTIVE or RRC_IDLE), the terminal apparatus 2 includes the entries described below in the variable VarMobilityHistoryReport. At this time, the terminal apparatus 2 may include the entries after deleting the oldest entry based on the size of the variable VarMobilityHistoryReport or the like. The terminal apparatus 2 includes the information of the time spent outside EUTRA and NR (i.e., in a cell of RAT other than EUTRA and NR or an out-of-service area) in timeSpent, which is one of the entry fields. At this time, visitedCellId need not be included in the entries. The entries are included in the variable VarMobilityHistoryReport.

Example 2: In a case that the terminal apparatus 2 supports the accumulation of mobility history information, the terminal apparatus 2 performs the following procedure. Here, an example using the entry list illustrated in FIG. 8 is illustrated.

Procedure 1: In a case of changing from the PCell, which is one of the serving cells in the RRC_CONNECTED of EUTRA, or the serving cell in the RRC_IDLE of EUTRA to another cell or an out-of-service area (Out of service), the terminal apparatus 2 includes a list (VisitedCellInfoListEUTRA) of entries (VisitedCellInfoEUTRA) described below in a variable VarMobilityHistoryReportEUTRA. At this time, the terminal apparatus 2 may delete the oldest entry based on the maximum number of entries that can be accumulated in the variable VarMobilityHistoryReportEUTRA, before including the entries in the variable. In a case that the cell global identifier of the preceding PCell or serving cell is present (Available), the terminal apparatus 2 may include the cell global identifier (cellGlobalId) of the cell in visitedCellId, which is one of the entry fields. In a case that the cell global identifier of the preceding PCell or serving cell is not present (Available), the terminal apparatus 2 includes the physical cell identifier (physCellId) of the cell and the information (carrierFreq) of the carrier frequency of the cell in visitedCellId, which is one of the entry fields. In either case, the terminal apparatus 2 includes the information of the time spent in the PCell or the serving cell, in timeSpent, which is one of the entry fields. The entries are included in the variable VarMobilityHistoryReportEUTRA.

Procedure 2: In a case of moving from the cell of RAT other than EUTRA or the out-of-service area into (a cell of) EUTRA (in the RRC_CONNECTED or RRC_IDLE), the terminal apparatus 2 includes the entries described below in the variable VarMobilityHistoryReportEUTRA. At this time, the terminal apparatus 2 may include the entries after deleting the oldest entry based on the size of the variable VarMobilityHistoryReportEUTRA or the like. The terminal apparatus 2 includes the information of the time spent outside the EUTRA (i.e., a cell of another RAT or an out-of-service area) in timeSpent, which is one of the entry fields. At this time, visitedCellId need not be included in the entries. The entries are included in the variable VarMobilityHistoryReportEUTRA.

Procedure 3: In a case of changing from the PCell, which is one of the serving cells in the RRC_CONNECTED of NR, or the serving cell in the RRC_IDLE or RRC_INACTIVE of NR to another cell or an out-of-service area (Out of service), the terminal apparatus 2 includes the list (VisitedCellInfoListNR) of the entries (VisitedCellInfoNR) described below in the variable VarMobilityHistoryReportNR. At this time, the terminal apparatus 2 may include the entries after deleting the oldest entry based on the maximum number of entries that can be accumulated in the variable VarMobilityHistoryReportNR. In a case that the cell global identifier of the preceding PCell or serving cell is present (Available), the terminal apparatus 2 may include the cell global identifier (cellGlobalId) of the cell in visitedCellId, which is one of the entry fields. In a case that the cell global identifier of the preceding PCell or serving cell is not present (Available), the terminal apparatus 2 includes the physical cell identifier (physCellId) of the cell and the information (ssbFrequency) of the frequency of the SS/PBCH block in visitedCellId, which is one of the entry fields. In either case, the terminal apparatus 2 may include the information of the time spent in the PCell or the serving cell, in timeSpent, which is one of the entry fields. The entries are included in the variable VarMobilityHistoryReport possiblyNR.

Procedure 4: In a case of moving from the cell of RAT other than NR or the out-of-service area into (a cell of) NR (in the RRC_CONNECTED or RRC_INACTIVE or RRC_IDLE), the terminal apparatus 2 includes the entries described below in the variable VarMobilityHistoryReportNR. At this time, the terminal apparatus 2 may include the entries after deleting the oldest entry based on the size of the variable VarMobilityHistoryReportNR or the like. The terminal apparatus 2 includes the information of the time spent outside of NR (i.e., in a cell of another RAT in an out-of-service area) in timeSpent, which is one of the entry fields. At this time, visitedCellId need not be included in the entries. The entries are included in the variable VarMobilityHistoryReportNR.

Example 3: In a case that the terminal apparatus 2 supports the accumulation of the mobility history information, the terminal apparatus 2 performs the following procedure.

Procedure 1: In a case of changing from the PCell, which is one of the serving cells in the RRC_CONNECTED of EUTRA, or the serving cell in the RRC_IDLE of EUTRA to another cell or an out-of-service area (Out of service), the terminal apparatus 2 includes the list (VisitedCellInfoListEUTRA) of the entries (VisitedCellInfoEUTRA) described below in the variable VarMobilityHistoryReportEUTRA. At this time, the terminal apparatus 2 may delete the oldest entry based on the maximum number of entries that can be accumulated in the variable VarMobilityHistoryReportEUTRA, before including the entries in the variable. In a case that the cell global identifier of the preceding PCell or serving cell is present (Available), the terminal apparatus 2 includes the cell global identifier of the cell in visitedCellId, which is one of the entry fields. In a case that the cell global identifier of the preceding PCell or serving cell is not present (not Available), the terminal apparatus 2 includes information of the physical cell identifier and information of the carrier frequency of the cell in visitedCellId, which is one of the entry fields. In either case, the terminal apparatus 2 includes the information of the time spent in the PCell or the serving cell, in timeSpent, which is one of the entry fields. The entries are included in the variable VarMobilityHistoryReportEUTRA.

Procedure 2: In a case of moving from the cell of RAT other than EUTRA or the out-of-service area to (a cell of) EUTRA (in the RRC_CONNECTED or RRC_IDLE), the terminal apparatus 2 includes the entries described below in the variable VarMobilityHistoryReportEUTRA. At this time, the terminal apparatus 2 may include the entries after deleting the oldest entry based on the size of the variable VarMobilityHistoryReportEUTRA or the like. The terminal apparatus 2 includes the information of the time spent outside the EUTRA (i.e., a cell of another RAT or an out-of-service area) in timeSpent, which is one of the entry fields. At this time, visitedCellId need not be included in the entries. The entries are included in the variable VarMobilityHistoryReportEUTRA.

Procedure 3: In a case of changing from the PCell, which is one of the serving cells in the RRC_CONNECTED of EUTRA or NR, or the serving cell in the RRC_IDLE of EUTRA or NR or in the RRC_INACTIVE of NR to another cell or an out-of-service area (Out of service), the terminal apparatus 2 includes the list (VisitedCellInfoListNR) of the entries (VisitedCellInfoNR) described below in the variable VarMobilityHistoryReportNR. At this time, the terminal apparatus 2 may include the entries after deleting the oldest entry based on the maximum number of entries that can be accumulated in the variable VarMobilityHistoryReportNR. In a case that the cell global identifier of the preceding PCell or serving cell is present (Available), the terminal apparatus 2 may include the cell global identifier of the cell in visitedCellId, which is one of the entry fields. In addition, in a case that the preceding PCell or serving cell is a cell of NR, information of the cell of NR may be included. For example, the information of the cell of NR may be the cell global identifier of the cell and/or the index information of the SS/PBCH block. In a case that the cell global identifier of the preceding PCell or serving cell is not present (not Available) and the preceding PCell or serving cell is a cell of EUTRA, the terminal apparatus 2 includes the physical cell identifier (physCellId) of the cell and information of the carrier frequency of the cell in visitedCellId, which is one of the entry fields. In a case that the preceding PCell or serving cell is a cell of NR, information of the cell of NR may be included in visitedCellId, which is one of the entry fields. The information of the cell of NR may, for example, be the information of the physical cell identifier of the cell and the frequency of the SS/PBCH block. The information of the cell of NR may be, for example, the physical cell identifier of the cell, the information of the frequency of the SS/PBCH block, and the index information of the SS/PBCH block. In either case, the terminal apparatus 2 may include the information of the time spent in the PCell or the serving cell, in timeSpent, which is one of the entry fields. The entries are included in the variable VarMobilityHistoryReportNR.

Procedure 4: In a case of moving from the cell of RAT other than EUTRA and NR or the out-of-service area into (a cell of) EUTRA or NR (in the RRC_CONNECTED or RRC_INACTIVE or RRC_IDLE), the terminal apparatus 2 includes the entries described below in the variable VarMobilityHistoryReportNR. At this time, the terminal apparatus 2 may include the entries after deleting the oldest entry based on the size of the variable VarMobilityHistoryReportNR or the like. The terminal apparatus 2 includes the information of the time spent outside EUTRA and NR (i.e., in a cell of RAT other than EUTRA and NR or an out-of-service area) in timeSpent, which is one of the entry fields. At this time, visitedCellId need not be included in the entries. The entries are included in the variable VarMobilityHistoryReportNR.

Now, a terminal apparatus information (UE Information) procedure with NR taken into account will be described. The terminal apparatus information procedure is used for the base station apparatus 3 (network) to request an information report from the terminal apparatus 2. For example, the mobility history information may be notified from the terminal apparatus 2 to the base station apparatus 3 in accordance with the procedure.

Example 1: The network initiates the procedure by sending, to the terminal apparatus 2, a message (UEInformationRequest message) requesting information of the terminal apparatus.

Procedure 1: The terminal apparatus 2 receives, from the network, the UEInformationRequest message after activation of security succeeds, and then performs Procedures 2 to 4 in a case that mobilityHistoryReportReq, which is one element of the UEInformationRequest message, is set true. In a case that mobilityHistoryReportReq is not set true or mobilityHistoryReportReq is not included, procedure 2 and procedure 3 need not be performed.

Procedure 2: mobilityHistoryReport is included in the UEInformationResponse message, and the entry of VarMobilityHistoryReport is included in mobilityHistoryReport. Furthermore, the terminal apparatus 2 includes the cell global identifier of the current cell (PCell) in visitedCellId, which is one of the entry fields. At this time, the terminal apparatus 2 may include the entries after deleting the oldest entry based on the size of mobilityHistoryReport.

Procedure 3: The terminal apparatus 2 includes the information of the time spent in the current cell, in timeSpent, which is one of the entry fields. The entries are included in mobilityHistoryReport.

Procedure 4: The UEInformationResponse message is submitted to the lower layer for transmission through the SRB1 or SRB2.

In addition, in Procedure 2, in a case that VarMobilityHistoryReport is an independent variable between EUTRA and NR, the entries of both VarMobilityHistoryReportEUTRA and VarMobilityHistoryReportNR may be included in mobilityHistoryReport. At this time, a predefined number of entries may be selected from chronologically later entries in both lists for EUTRA and NR and included in mobilityHistoryReport.

In addition, in Procedure 1, in a case that mobilityHistoryReportReq has multiple values, then for example, whether the identifier information of the cells of RAT other than the RAT of the PCell is included in mobilityHistoryReport or not may be indicated. In a case that the identifier information of the cells of RAT other than the RAT of the PCell is not included, the information included in the mobilityHistoryReport related to the cells of RAT other than the RAT of the PCell is only timeSpent as is the case with the known mobilityHistoryReport.

Example 2: The network initiates the procedure by sending, to the terminal apparatus 2, a message (UEInformationRequest message) requesting information of the terminal apparatus.

Procedure 1: The terminal apparatus 2 receives, from the network, the UEInformationRequest message after activation of security succeeds, and then performs Procedures 2 to 4 in a case that mobilityHistoryReportReq, which is one element of the UEInformationRequest message, is set true. In a case that mobilityHistoryReportReq is not set true or mobilityHistoryReportReq is not included, procedure 2 and procedure 3 need not be performed.

Procedure 2: mobilityHistoryReport is included in the UEInformationResponse message. For example, mobilityHistoryReport may include mobilityHistoryReportEUTRA and mobilityHistoryReportNR as elements. In this case, the entry of VarMobilityHistoryReportEUTRA is included in the mobilityHistoryReportEUTRA, and the entry of VarMobilityHistoryReportNR is included in the mobilityHistoryReportNR. Furthermore, in a case that the PCell is a cell of EUTRA, the terminal apparatus 2 includes the cell global identifier of the current cell (PCell) in visitedCellId, which is one of the entry fields of MobilityHistoryReportEUTRA. Additionally, in a case that the PCell is a cell of NR, the terminal apparatus 2 includes the cell global identifier of the current cell (PCell) in visitedCellId, which is one of the entry fields of MobilityHistoryReportNR. At this time, the terminal apparatus 2 may include the entry after deleting the oldest entry based on the size of the mobilityHistoryReportEUTRA and/or MobilityHistoryReportNR, and the like.

Procedure 3: In a case that the PCell is a cell of EUTRA, the terminal apparatus 2 includes the information of the time spent in the current cell, in timeSpent, which is one of the entry fields of MobilityHistoryReportEUTRA. Additionally, in a case that the PCell is a cell of NR, the terminal apparatus 2 includes the information of the time spent in the current cell, in timeSpent, which is one of the entry fields of MobilityHistoryReportNR.

Procedure 4: The UEInformationResponse message is submitted to the lower layer for transmission through the SRB1 or SRB2.

Note that, in Procedure 2, in a case that the PCell complies with EUTRA, mobilityHistoryReportEUTRA and mobilityHistoryReportNR included in mobilityHistoryReport may include the entry of VarMobilityHistoryReportEUTRA and the entry of VarMobilityHistoryReportNR as RRC information elements for EUTRA. In addition, in a case that the PCell complies with NR, mobilityHistoryReportEUTRA and mobilityHistoryReportNR included in mobilityHistoryReport may include the entry of VarMobilityHistoryReportEUTRA and the entry of VarMobilityHistoryReportNR as RRC information elements for NR.

In addition, in Procedure 2, as another example, in a case that the PCell complies with EUTRA, mobilityHistoryReportEUTRA included in the mobilityHistoryReport includes the entry of VarMobilityHistoryReportEUTRA as an RRC information element for EUTRA, and mobilityHistoryReportNR includes Octet strings. The Octet strings may be the entry of VarMobilityHistoryReportNR encoded as an RRC information element for NR (encoded by abstract syntax notation 1 in NR). In addition, in a case that the PCell complies with NR, mobilityHistoryReportNR included in the mobilityHistoryReport includes the entry of VarMobilityHistoryReportNR as an RRC information element for NR, and mobilityHistoryReportEUTRA includes Octet strings. The Octet strings may be the entry of VarMobilityHistoryReportEUTRA encoded as an RRC information element for EUTRA (encoded by abstract syntax notation 1 in EUTRA).

In addition, in Procedure 1, in a case that mobilityHistoryReportReq has multiple values, then for example, whether EUTRA information (mobilityHistoryReportEUTRA) is included in mobilityHistoryReport may be indicated, and whether NR information (mobilityHistoryReportNR) is included in mobilityHistoryReport may be indicated.

Example 3: The network initiates the procedure by sending, to the terminal apparatus 2, a message (UEInformationRequest message) requesting information of the terminal apparatus.

Procedure 1: The terminal apparatus 2 receives, from the network, the UEInformationRequest message after activation of security succeeds, and then performs Procedures 2 to 4 in a case that mobilityHistoryReportReq, which is one element of the UEInformationRequest message, is set true. In a case that mobilityHistoryReportReq is not set true or mobilityHistoryReportReq is not included, procedure 2 and procedure 3 need not be performed.

Procedure 2: mobilityHistoryReport is included in the UEInformationResponse message. For example, in a case that the RAT of the PCell is EUTRA, then mobilityHistoryReport may include mobilityHistoryReportEUTRA as an element. For example, in a case that the RAT of the PCell is NR, then mobilityHistoryReport may include mobilityHistoryReportEUTRA and mobilityHistoryReportNR as elements. In this case, the entry of VarMobilityHistoryReportEUTRA is included in the mobilityHistoryReportEUTRA, and the entry of VarMobilityHistoryReportNR is included in the mobilityHistoryReportNR. Furthermore, in a case that the PCell is a cell of EUTRA, the terminal apparatus 2 includes the cell global identifier of the current cell (PCell) in visitedCellId, which is one of the entry fields of MobilityHistoryReportEUTRA. Additionally, in a case that the PCell is a cell of NR, the terminal apparatus 2 includes the cell global identifier of the current cell (PCell) in visitedCellId, which is one of the entry fields of MobilityHistoryReportNR. At this time, the terminal apparatus 2 may include the entry after deleting the oldest entry based on the size of the mobilityHistoryReportEUTRA and/or MobilityHistoryReportNR, and the like.

Procedure 3: In a case that the PCell is a cell of EUTRA, the terminal apparatus 2 includes the information of the time spent in the current cell, in timeSpent, which is one of the entry fields of MobilityHistoryReportEUTRA. Additionally, in a case that the PCell is a cell of NR, the terminal apparatus 2 includes the information of the time spent in the current cell, in timeSpent, which is one of the entry fields of MobilityHistoryReportNR.

Procedure 4: The UEInformationResponse message is submitted to the lower layer for transmission through the SRB1 or SRB2.

Additionally, in Procedure 1, for example, in a case that the RAT of the PCell is NR, mobilityHistoryReportReq has multiple values, for example: mobilityHistoryReportReq may indicate whether the mobilityHistoryReport includes EUTRA information (mobilityHistoryReportEUTRA) or not.

Now, a mechanism will be described in which the base station apparatus 3 is notified of information indicating that the mobility history information is present in the terminal apparatus 2 (Available).

Example 1: A procedure is illustrated in which the terminal apparatus 2 notifies the base station apparatus 3 of the existence of mobility history information during the RRC connection in consideration of NR.

For example, in a connection re-establishment procedure, the terminal apparatus 2 receives an RRC connection setup message from the base station apparatus 3, and then performs a configuration procedure for radio resources in accordance with a radio resource individual configuration (radioResourceConfigDedicated) included in the received RRC connection setup message. Furthermore, the terminal apparatus 2, for example, stops various timers and enters RRC_CONNECTED to stop the cell re-selection procedure. Then, the terminal apparatus 2 determines the current cell to be PCell. Furthermore, in a case that any information has been received from the higher layer (NAS layer) as the content of a message (RRCConnectionSetupComplete message) indicating to the base station apparatus 3 that the RRC connection setup is complete, the terminal apparatus 2 includes the information as dedicatedInfoNAS, and in a case that the terminal apparatus 2 supports the accumulation of the mobility history information and the mobility history information is present in the variable VarMobilityHistoryReport (Available), then the terminal apparatus 2 includes, in the entries, information (mobilityHistoryAvail) indicating the presence of the mobility history information (Available). The RRCConnectionSetupComplete Message may include other information. The terminal apparatus 2 Submits the RRCConnectionSetupComplete message to the lower layer for transmission, and terminates the procedure. In addition, in the above example, in a case that the variable VarMobilityHistoryReportEUTRA and the variable VarMobilityHistoryReportNR are used instead of the variable VarMobilityHistoryReport and that the mobility history information is present in any of the variables (Available), information (mobilityHistoryAvail) indicating that the mobility history information is present (Available) may be included.

Example 2: A procedure is illustrated in which the terminal apparatus 2 notifies the base station apparatus 3 of the presence of the mobility history information during the RRC connection with NR taken into account.

For example, in a connection re-establishment procedure, the terminal apparatus 2 receives an RRC connection setup message from the base station apparatus 3, and then performs a configuration procedure for radio resources in accordance with a radio resource individual configuration (radioResourceConfigDedicated) included in the received RRC connection setup message. Furthermore, the terminal apparatus 2, for example, stops various timers and enters RRC_CONNECTED to stop the cell re-selection procedure. Then, the terminal apparatus 2 determines the current cell to be PCell. Furthermore, in a case that any information has been received from the higher layer (NAS layer) as the content of the message (RRCConnectionSetupComplete message) indicating to the base station apparatus 3 that the RRC connection setup is complete, the terminal apparatus 2 includes the information as dedicatedInfoNAS, and in a case that the terminal apparatus 2 supports the accumulation of the mobility history information and the mobility history information is present in the variable VarMobilityHistoryReportEUTRA (Available), then the terminal apparatus 2 includes, in the entries, information (mobilityHistoryAvail) indicating the presence of the EUTRA mobility history information (Available). Furthermore, in a case that the terminal apparatus 2 supports the accumulation of mobility history information, and the mobility history information is present in the variable VarMobilityHistoryReportNR (Available), the terminal apparatus 2 includes, in the entries, information (mobilityHistoryAvail) indicating the presence of NR mobility history information (Available). The RRCConnectionSetupComplete Message may include other information. The terminal apparatus 2 Submits the RRCConnectionSetupComplete message to the lower layer for transmission, and terminates the procedure.

The example of the RRC connection setup processing has been described, but the present invention is not limited to this example, and in the processing at the time of RRC connection resumption (Resume) as well, the terminal apparatus 2 supports accumulation of the mobility history information as the content of a message (RRCConnectionResumeComplete message) indicating to the base station apparatus 3 that the RRC connection resumption is complete. In a case that the mobility history information is present in the variable VarMobilityHistoryReport (Available), the terminal apparatus 2 may include, in the entries, the information (mobilityHistoryAvail) indicating the presence of the mobility history information (Available).

Additionally, mobilityHistoryAvail described above may include information indicating whether the index information of the SS/PBCH block is accumulated or not.

The mechanism for notifying the mobility history information may include a combination of any examples of the aforementioned procedures, or a part of the mechanism for notifying the mobility history information may involve any one of the examples of the above-described procedures or a combination of the examples.

According to the above-described mechanism, for example, the terminal apparatus 2 can accumulate information for inclusion in the mobilityHistoryReport for each RAT, and can select and notify the required information based on the configuration, version, requirements, and the like of the network. For example, based on information indicating whether the base station apparatus 3 supports EN-DC, whether the base station apparatus 3 supports 5GC, and the like, the required information can be selected and notified. The required information of the RAT may be explicitly notified or broadcast from the network, or the necessary information may be implicitly selected and notified based on notification information, broadcast information, and the like related to the configuration of the base station apparatus 3. The terminal apparatus 2 may implicitly select and notify information based on terminal capability information (UE capability) notified from the terminal apparatus 2 to the network.

According to the above-described mechanism, for example, the terminal apparatus 2 can accumulate multiple RATs of information for inclusion in mobilityHistoryReport as a single mass, and can notify the network of information the amount of which is larger than the amount of the known mobility history information.

In the example described above, the cell global identifier, the physical cell identifier, the index of the SSB/PBCH block, the carrier frequency, and the like are used as the information included in the mobility history information. However, the present invention is not limited to these types of information. As information for identifying the cell, for example, positional information as obtained by the Global Positioning System (GPS) and other identifiers may be included. Additionally, the mobility history information may include identifier information of Tracking Areas (TAs) for determining the position of the terminal apparatus 2 in the RRC_IDLE state, including one or more cells, and RAN areas (RLA: RAN-based location areas) for determining the position of the terminal apparatus 2 in the RRC_INACTIVE state, including one or more cells.

Additionally, the configurations of the messages or entries are not limited to the configurations described above, and may be other configurations.

A configuration of the apparatus in the embodiment of the present invention will be described.

Figure 2:
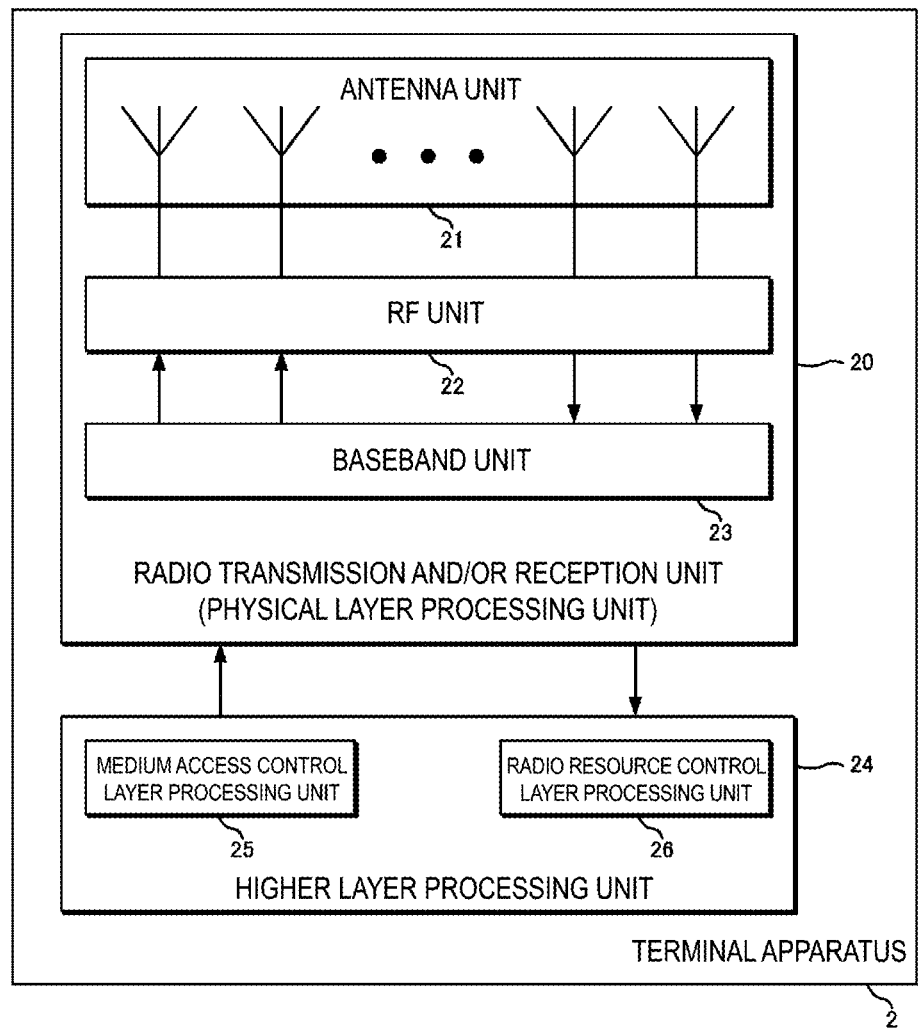
FIG. 2 is a block diagram schematically illustrating an example of a configuration of a terminal apparatus according to an embodiment of the present invention.

FIG. 2 is a schematic block diagram illustrating a configuration of the terminal apparatus 2 according to the present embodiment. As illustrated, the terminal apparatus 2 is configured to include a radio transmission and/or reception unit 20 and a higher layer processing unit 24. The radio transmission and/or reception unit 20 is configured to include an antenna unit 21, a radio frequency (RF) unit 22, and a baseband unit 23. The higher layer processing unit 24 is configured to include a medium access control layer processing unit 25 and a radio resource control layer processing unit 26. Additionally, the higher layer processing unit 24 may include a PDCP layer processing unit configured to perform processing in the PDCP layer, and a radio link control layer processing unit configured to perform processing in the radio link control layer. The radio transmission and/or reception unit 20 is also referred to as a transmitter, a receiver or a physical layer processing unit. A controller controlling operations of the units based on various conditions may be separately provided.

The higher layer processing unit 24 outputs uplink data (transport blocks) generated by a user operation or the like, to the radio transmission and/or reception unit 20. The higher layer processing unit 24 performs some or all of the processings of the Medium Access Control (MAC) layer, the Packet Data Convergence Protocol (PDCP) layer, the Radio Link Control (RLC) layer, and the Radio Resource Control (RRC) layer.

The medium access control layer processing unit 25 included in the higher layer processing unit 24 performs processing of the Medium Access Control layer. The medium access control layer processing unit 25 controls transmission of a scheduling request, based on various types of configuration information/parameters managed by the radio resource control layer processing unit 26.

The radio resource control layer processing unit 26 included in the higher layer processing unit 24 performs processing of the Radio Resource Control layer. The radio resource control layer processing unit 26 manages various types of configuration information/parameters of its own apparatus. The radio resource control layer processing unit 26 sets various types of configuration information/parameters based on higher layer signaling received from the base station apparatus 3. Namely, the radio resource control layer processing unit 26 sets the various configuration information/parameters in accordance with the information indicating the various configuration information/parameters received from the base station apparatus 3.

The radio transmission and/or reception unit 20 performs processing of the physical layer, such as modulation, demodulation, coding, decoding, and the like. The radio transmission and/or reception unit 20 demultiplexes, demodulates, and decodes a signal received from the base station apparatus 3, and outputs the information resulting from the decoding to the higher layer processing unit 24. The radio transmission and/or reception unit 20 generates a transmit signal by modulating and coding data, and transmits the signal to the base station apparatus 3.

The RF unit 22 converts (down-coverts) a signal received via the antenna unit 21 into a baseband signal by orthogonal demodulation, and removes unnecessary frequency components. The RF unit 22 outputs the processed analog signal to the baseband unit.

The baseband unit 23 converts the analog signal input from the RF unit 22 into a digital signal. The baseband unit 23 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 23 generates an SC-FDMA symbol by performing Inverse Fast Fourier Transform (IFFT) of the data, adds CP to the generated SC-FDMA symbol, generates a baseband digital signal, and converts the baseband digital signal into an analog signal. The baseband unit 23 outputs the analog signal resulting from the conversion, to the RF unit 22.

The RF unit 22 removes unnecessary frequency components from the analog signal input from the baseband unit 23 using a low-pass filter, up-converts the analog signal into a signal of a carrier frequency, and transmits the up-converted signal via the antenna unit 21. Furthermore, the RF unit 22 amplifies power. Furthermore, the RF unit 22 may have a function of controlling transmit power. The RF unit 22 is also referred to as a transmit power controller.

Note that the terminal apparatus 2 may be configured to include a part or all of each unit in multiple, in order to support transmission and/or reception processing in multiple frequencies (frequency bands, a frequency bandwidths) or the same subframe in the cell.

Figure 3:
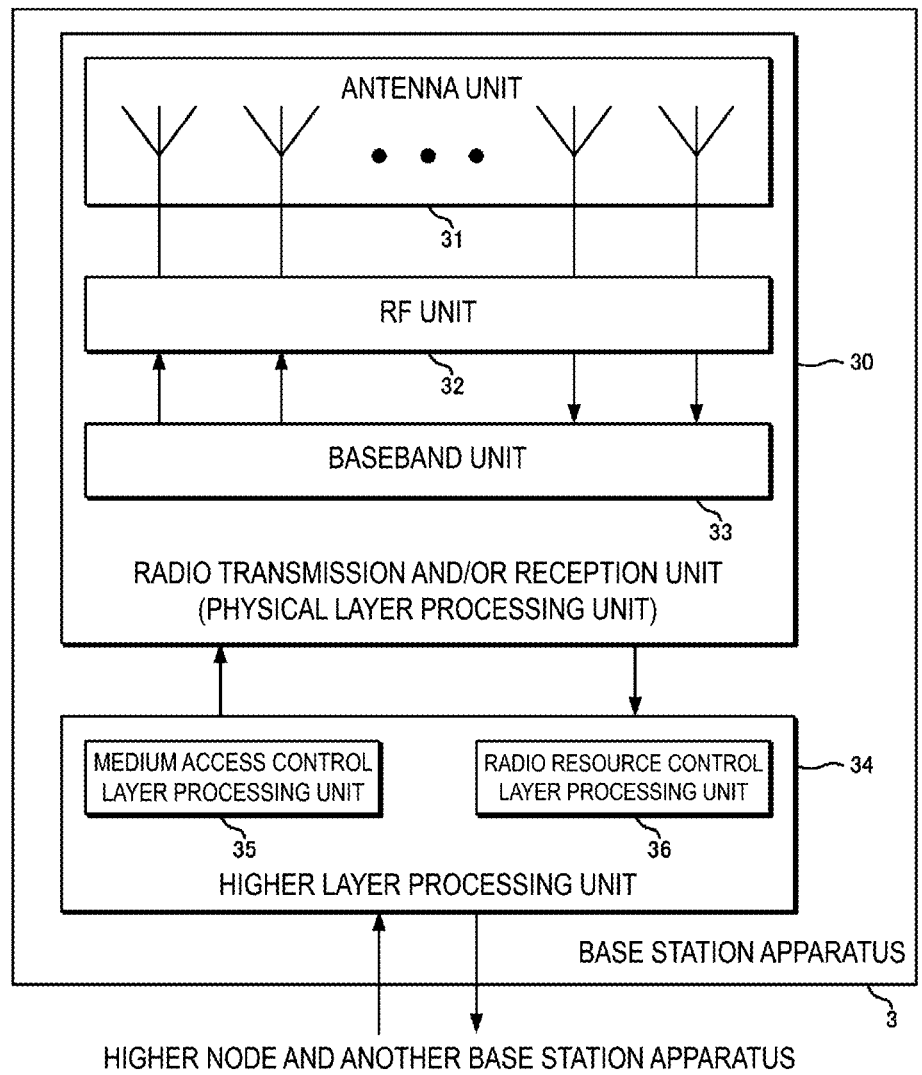
FIG. 3 is a block diagram schematically illustrating an example of a configuration of a base station apparatus according to the embodiment of the present invention.

FIG. 3 is a schematic block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit. A controller controlling operations of the units based on various conditions may be separately provided.

The higher layer processing unit 34 performs processing for some or all of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. Furthermore, the radio resource control layer processing unit 36 manages various types of configuration information/parameters for each of the terminal apparatuses 2. The radio resource control layer processing unit 36 may set various types of configuration information/parameters for each of the terminal apparatuses 2 via the higher layer signaling. That is, the radio resource control layer processing unit 36 transmits/reports information indicating various types of configuration information/parameters.

The functionality of the radio transmission and/or reception unit 30 is similar to the functionality of the radio transmission and/or reception unit 20, and hence description thereof is omitted. Note that in a case that the base station apparatus 3 is connected to one or more transmission reception points 4, some or all of the functions of the radio transmission and/or reception unit 30 may be included in each of the transmission reception points 4.

Further, the higher layer processing unit 34 transmits (transfers) or receives control messages or user data between the base station apparatuses 3 or between a higher network apparatus (MME, S-GW (Serving-GW)) and the base station apparatus 3. Although, in FIG. 3, other constituent elements of the base station apparatus 3, a transmission path of data (control information) between the constituent elements, and the like are omitted, it is apparent that the base station apparatus 3 is provided with multiple blocks, as constituent elements, including other functions necessary to operate as the base station apparatus 3. For example, a Radio Resource Management layer processing unit or an application layer processing unit exist in the higher order of the radio resource control layer processing unit 36.

Note that "units" in the drawing refer to constituent elements to realize the functions and the procedures of the terminal apparatus 2 and the base station apparatus 3, which are also represented by the terms such as a section, a circuit, a constituting apparatus, a device, a unit, and the like. Furthermore, the "units" in the drawings may include various processing units and/or controllers that are not illustrated.

Each of the units having the reference signs 20 to 26 included in the terminal apparatus 2 may be configured as a circuit. Each of the units having the reference signs 30 to 36 included in the base station apparatus 3 may be configured as a circuit.

Various aspects of the terminal apparatus 2 and the base station apparatus 3 according to the embodiment of the present invention will be described.

(1) A first aspect of the present invention provides a terminal apparatus including a receiver configured to receive, from a base station apparatus, a message requesting mobility history information, and a transmitter configured to notify the base station apparatus of the mobility history information, based on the message, wherein the mobility history information includes a list including identifier information (first identifier information) of a cell of a first radio access technology, and a list including identifier information (second identifier information) of a cell of a second radio access technology, and the mobility history information includes stay time information of a limited number of entries, each corresponding to a visit by the terminal apparatus in a cell and/or outside a network.

(2) A second aspect of the present invention provides a base station apparatus including a transmitter configured to transmit, to a terminal apparatus, a message requesting mobility history information, and a receiver configured to receive the mobility history information from the terminal apparatus, wherein the mobility history information includes a list including identifier information (first identifier information) of a cell of a first radio access technology, and a list including identifier information (second identifier information) of a cell of a second radio access technology, and the mobility history information includes stay time information of a limited number of entries, each corresponding to a visit by the terminal apparatus in a cell and/or outside a network.

(3) A third aspect of the present invention is a communication method applied to a terminal apparatus, the communication method including the steps of receiving, from a base station apparatus, a message requesting mobility history information, and notifying the base station apparatus of the mobility history information, based on the message, wherein the mobility history information includes a list including identifier information (first identifier information) of a cell of a first radio access technology, and a list including identifier information (second identifier information) of a cell of a second radio access technology, and the mobility history information includes stay time information of a limited number of entries, each corresponding to a visit by the terminal apparatus in a cell and/or outside a network.

(4) A fourth aspect of the present invention is a communication method applied to a base station apparatus, the communication method including the steps of transmitting, to a terminal apparatus, a message requesting mobility history information, and receiving the mobility history information from the terminal apparatus, wherein the mobility history information includes a list including identifier information (first identifier information) of a cell of a first radio access technology, and a list including identifier information (second identifier information) of a cell of a second radio access technology, and the mobility history information includes stay time information of a limited number of entries, each corresponding to a visit by the terminal apparatus in a cell and/or outside a network.

(5) A fifth aspect of the present invention is an integrated circuit mounted on a terminal apparatus, the integrated circuit being configured to cause the terminal apparatus to perform functions of receiving, from a base station apparatus, a message requesting mobility history information, and notifying the base station apparatus of the mobility history information, based on the message, wherein the mobility history information includes a list including identifier information (first identifier information) of a cell of a first radio access technology, and a list including identifier information (second identifier information) of a cell of a second radio access technology, and the mobility history information includes stay time information of a limited number of entries, each corresponding to a visit by the terminal apparatus in a cell and/or outside a network.

(6) A sixth aspect of the present invention is an integrated circuit mounted on a base station apparatus, the integrated circuit being configured to cause the base station apparatus to perform functions of transmitting, to a terminal apparatus, a message requesting mobility history information, and receiving the mobility history information from the terminal apparatus, wherein the mobility history information includes a list including identifier information (first identifier information) of a cell of a first radio access technology, and a list including identifier information (second identifier information) of a cell of a second radio access technology, and the mobility history information includes stay time information of a limited number of entries, each corresponding to a visit by the terminal apparatus in a cell and/or outside a network.

(7) A seventh aspect of the present invention is a terminal apparatus including a receiver configured to receive, from a base station apparatus, a message requesting mobility history information, and a transmitter configured to notify the base station apparatus of the mobility history information, based on the message, wherein, based on the message, whether to notify, as the mobility history information, mobility history information including identifier information of a cell of a first radio access technology and identifier information of a cell of a second radio access technology or mobility history information (second mobility history information) including, as cell identifier information, only the identifier information of the cells of the first radio access technology is determined.

(8) An eighth aspect of the present invention is a terminal apparatus including a transmitter configured to notify a base station apparatus of information indicating that the mobility history information is present (first information), and a processing unit configured to select, as the first information, either information indicating that, as information of identifiers of cells, validated information related to a cell of a first radio access technology and a cell of a second radio access technology is present or information indicating that, as the information of the identifiers of the cells, validated information related to the cells of the first radio access technology is present.

(9) A ninth aspect of the present invention is a terminal apparatus including: a receiver configured to receive, from a base station apparatus, a message requesting mobility history information, and a transmitter configured to notify the base station apparatus of the mobility history information, based on the message, wherein, as the mobility history information, mobility history information is notified that includes identifier information (first identifier information) of a cell of a first radio access technology and identifier information (second identifier information) of a cell of a second radio access technology corresponding to a radio access technology (second radio access technology) being different from the first radio access technology and being encoded by an abstract syntax notation 1, and the second identifier information includes one or more of multiple pieces of identifier information (third identifier information) broadcast in one cell.

Consequently, the terminal apparatus 2 and the base station apparatus 3 can communicate efficiently.

Note that the embodiments discussed thus far are merely examples, and the embodiments can be implemented using various kinds of modifications, replacement, or the like. For example, an uplink transmission scheme can be applied to both communication systems of a Frequency Division Duplex (FDD) scheme and a Time Division Duplex (TDD) scheme. The names of the parameters, events, and the like indicated in the embodiments are given for the sake of convenience of description; therefore, even in a case that the actual applied names differ from the names in the embodiments of the present invention, the spirit of the invention claimed in the embodiments of the present invention is not affected in any way.

The term "connection" used in the respective embodiments is not limited to the configuration in which a certain device and another device are directly connected using a physical line, and includes a configuration in which the devices are logically connected, a configuration in which the devices are radio-connected using the radio technology, and the like.

The terminal apparatus 2 is also called a user terminal, a mobile station apparatus, a communication terminal, a mobile apparatus, a terminal, User Equipment (UE), and a Mobile Station (MS). The base station apparatus 3 is also called a radio base station apparatus, a base station, a radio base station, a fixed station, a NodeB (NB), an evolved NodeB (eNB), a Base Transceiver Station (BTS), a Base Station (BS), an NR NodeB (NR NB), an NNB, a Transmission and Reception Point (TRP), and a next generation Node B (gNB).

The base station apparatus 3 according to the present invention can also be realized as an aggregation (an apparatus group) including multiple apparatuses. Each of the apparatuses constituting such an apparatus group may include some or all portions of each function or each functional block of the base station apparatus 3 according to the above-described embodiment. The apparatus group is required to have a complete set of functions or functional blocks of the base station apparatus 3. Furthermore, the terminal apparatus 2 according to the above-described embodiment can also communicate with the base station apparatus 3 as the aggregation.

Furthermore, the base station apparatus 3 according to the above-described embodiment may serve as an Evolved Universal Terrestrial Radio Access Network (EUTRAN), or a Next Generation Core network (NextGen Core), or 5G Core Network (5GC). Furthermore, the base station apparatus 3 according to the above-described embodiment may have some or all of the functions of a node higher than an eNodeB.

A program operating on an apparatus according to the present invention may serve as a program that controls a Central Processing Unit (CPU) and the like to cause a computer to operate in such a manner as to realize the functions of the above-described embodiments according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The invention claimed is:

1. A terminal apparatus comprising:
a receiver configured to receive, from a base station apparatus, a message requesting mobility history information; and
a transmitter configured to notify the base station apparatus of the mobility history information, based on the message, wherein
the mobility history information includes a list including identifier information of a first cell of a first radio access technology, the first cell being visited in an RRC INACTIVE state, and identifier information of a second cell of a second radio access technology, and
the mobility history information further includes stay duration information of time during which the terminal apparatus spends in the first cell and stay duration information of time during which the terminal apparatus spends in the second cell.

2. A base station apparatus comprising:
a transmitter configured to transmit, to a terminal apparatus, a message requesting mobility history information; and
a receiver configured to receive the mobility history information from the terminal apparatus, wherein
the mobility history information includes a list including identifier information of a first cell of a first radio access technology, the first cell being visited in an RRC INACTIVE state, and identifier information of a second cell of a second radio access technology, and
the mobility history information includes stay duration information of time during which the terminal apparatus spends in the first cell and stay duration information of time during which the terminal apparatus spends in the second cell.

3. A communication method applied to a terminal apparatus, the communication method comprising:
receiving, from a base station apparatus, a message requesting mobility history information; and
notifying the base station apparatus of the mobility history information, based on the message, wherein
the mobility history information includes a list including identifier information of a first cell of a first radio access technology, the first cell being visited in an RRC INACTIVE state, and identifier information of a second cell of a second radio access technology, and
the mobility history information includes stay duration information time during which the terminal apparatus spends in the first cell and stay duration information of time during which the terminal apparatus spends in the second cell.

4. A communication method applied to a base station apparatus, the communication method comprising:
transmitting, to a terminal apparatus, a message requesting mobility history information; and
receiving the mobility history information from the terminal apparatus, wherein
the mobility history information includes a list including identifier information of a first cell of a first radio access technology, the first cell being visited in an RRC INACTIVE state, and identifier information of a second cell of a second radio access technology, and
the mobility history information includes stay duration information of time during which the terminal apparatus spends in the first cell and stay duration information of time during which the terminal apparatus spends in the second cell.

5. An integrated circuit mounted on a terminal apparatus, the integrated circuit being configured to cause the terminal apparatus to perform:
receiving, from a base station apparatus, a message requesting mobility history information; and
notifying the base station apparatus of the mobility history information, based on the message, wherein
the mobility history information includes a list including identifier information of a first cell of a first radio access technology, the first cell being visited in an RRC INACTIVE state, and identifier information of a second cell of a second radio access technology, and
the mobility history information includes stay duration information of time during which the terminal apparatus spends in the first cell and stay duration information of time during which the terminal apparatus spends in the second cell.

6. An integrated circuit mounted on a base station apparatus, the integrated circuit being configured to cause the base station apparatus to perform:

transmitting, to a terminal apparatus, a message requesting mobility history information; and receiving the mobility history information from the terminal apparatus, wherein the mobility history information includes a list including identifier information of a first cell of a first radio access technology, the first cell being visited in an RRC INACTIVE state, and identifier information of a second cell of a second radio access technology, and the mobility history information includes stay duration information of time during which the terminal apparatus spends in the first cell and stay duration information of time during which the terminal apparatus spends in the second cell.

7. The terminal apparatus according to claim 1, wherein the mobility history information includes stay duration information of time during which the terminal apparatus spends outside networks of the first radio access technology and the second radio access technology.

8. The base station apparatus according to claim 2, wherein the mobility history information includes stay duration information of time during which the terminal apparatus spends outside networks of the first radio access technology and the secondradio access technology.

* * * * *